(12) United States Patent
Leite Pinheiro de Paiva et al.

(10) Patent No.: US 11,544,560 B2
(45) Date of Patent: Jan. 3, 2023

(54) PREFETCHING AND/OR COMPUTING RESOURCE ALLOCATION BASED ON PREDICTING CLASSIFICATION LABELS WITH TEMPORAL DATA

(71) Applicant: Microsoft Technology Licensing, LLC, Redmond, WA (US)

(72) Inventors: Joao Celestino Leite Pinheiro de Paiva, Sammamish, WA (US); Tao Lu, Kirkland, WA (US); Sayed Abdelaziz, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 341 days.

(21) Appl. No.: 16/845,981

(22) Filed: Apr. 10, 2020

(65) Prior Publication Data
US 2021/0319306 A1    Oct. 14, 2021

(51) Int. Cl.
  *G06K 9/62* (2022.01)
  *G06N 3/08* (2006.01)
  (Continued)

(52) U.S. Cl.
  CPC ............. *G06N 3/08* (2013.01); *G06K 9/6259* (2013.01); *G06K 9/6277* (2013.01); *G06N 3/049* (2013.01); *G06V 30/19173* (2022.01)

(58) Field of Classification Search
  CPC .... G06F 16/172; G06F 11/34; G06F 11/3452; G06F 2201/86; G06F 12/0862;
  (Continued)

(56) References Cited

U.S. PATENT DOCUMENTS 5,737,747 A    4/1998  Vishlitzky et al.
6,779,119 B1   8/2004  Moshfeghi et al.
(Continued)

FOREIGN PATENT DOCUMENTS

WO    2015095065 A1    6/2015
WO    2019120037 A1    6/2019

OTHER PUBLICATIONS

"International Search Report and Written Opinion Issued in PCT Application No. PCT/US2021/018083", dated May 7, 2021, 10 Pages.
(Continued)

*Primary Examiner* — Ian L Lemieux
(74) *Attorney, Agent, or Firm* — Fiala & Weaver P.L.L.C.

(57) ABSTRACT

Methods, systems and computer program products are provided for prefetching information and/or (pre)allocating computing resources based on predicting classification labels with temporal data. A trained temporal classification model forecasts events (e.g., too numerous for individual modeling) by predicting classification labels indicating whether events will occur, or a number of occurrences of the events, during each of a plurality of future time intervals. Time-series datasets, indicating whether events occurred, or a number of occurrences of the events, during each of a plurality of past time intervals, are transformed into temporal classification datasets. Classifications may be based, at least in part, on extracted features, such as data seasonality, temporal representation, statistical and/or real-time features. Classification labels are used to determine whether to take one or more actions, such as, for example, prefetching information or (pre)allocating a computing resource.

20 Claims, 16 Drawing Sheets

(51) Int. Cl.
*G06N 3/04* (2006.01)
*G06V 30/19* (2022.01)

(58) Field of Classification Search
CPC .... G06F 2209/482; G06F 16/35; G06F 17/18; G06F 9/50; G06F 9/4881; G06F 9/6267; G06F 9/6259; G06F 9/6277; G06N 20/00; G06N 3/08; G06N 3/049; G06Q 10/06; G06Q 10/06314; G06Q 10/06315; G06Q 10/109; H04L 47/822; H04L 67/1002; H04L 67/2847; H04L 29/0881; H04L 41/064

See application file for complete search history.

(56) References Cited

U.S. PATENT DOCUMENTS

| | | | |
|---|---|---|---|
| 7,979,415 | B2 | 7/2011 | Shen et al. |
| 8,769,691 | B1 | 7/2014 | Ho et al. |
| 9,135,559 | B1* | 9/2015 | Chan ................ G06N 5/022 |
| 9,942,312 | B1 | 4/2018 | Langseth et al. |
| 10,402,244 | B2* | 9/2019 | Neuvirth-Telem ...... G06F 11/00 |
| 10,496,927 | B2* | 12/2019 | Achin ................ G06N 5/02 |
| 10,713,594 | B2* | 7/2020 | Szeto ................ G06N 20/00 |
| 2010/0057687 | A1 | 3/2010 | Shen et al. |
| 2011/0225015 | A1* | 9/2011 | Spivack ............ G06Q 10/10 705/14.5 |
| 2013/0159383 | A1 | 6/2013 | Tuliani et al. |
| 2013/0226837 | A1 | 8/2013 | Lymberopoulos et al. |
| 2014/0359074 | A1 | 12/2014 | Igelka |
| 2014/0373032 | A1 | 12/2014 | Merry et al. |
| 2019/0050748 | A1* | 2/2019 | Cmielowski ........ G06Q 10/067 |
| 2020/0293923 | A1* | 9/2020 | Zhu ................ G06N 5/04 |
| 2021/0117384 | A1 | 4/2021 | Leite Pinheiro de Paiva et al. |
| 2021/0240372 | A1* | 8/2021 | Loh ................ G06F 3/0605 |

OTHER PUBLICATIONS

"International Search Report and Written Opinion Issued in PCT Application No. PCT/US20/054648", dated Dec. 17, 2020, 10 Pages.

"Final Office Action Issued In U.S. Appl. No. 16/654,965", dated Mar. 17, 2021, 12 Pages.

"Autoregressive Integrated Moving Average", Retrieved from https://en.wikipedia.org/wiki/Autoregressive_integrated_moving_average, Retrieved on Sep. 3, 2019, 6 Pages.

"Azure Data Lake Storage Gen2 Pricing", Retrieved from https://azure.microsoft.com/en-us/pricing/details/storage/data-lake/, Retrieved on Sep. 3, 2019, 10 Pages.

"Azure Databricks Pricing", Retrieved from https://azure.microsoft.com/en-us/pricing/details/databricks/, Retrieved on Sep. 3, 2019, 24 Pages.

"Event Hubs Pricing", Retrieved from https://azure.microsoft.com/en-us/pricing/details/event-hubs/, Retrieved on Sep. 3, 2019, 7 Pages.

"Exponential Smoothing", Retrieved from https://en.wikipedia.org/wiki/Exponential_smoothing, Retrieved on: May 30, 2019, 7 Pages.

"Non Final Office Action Issued in U.S. Appl. No. 16/654,965", dated Sep. 30, 2020, 9 Pages.

"Non Final Office Action Issued in U.S. Appl. No. 16/654,965", dated Sep. 29, 2021, 12 Pages.

* cited by examiner

| Key | 1556236800000 | 1556240400000 | 1556244000000 | ... | 1556260800000 |
|---|---|---|---|---|---|
| 99126c36-7660-... | 5 | 2 | 0 | | 1 |
| 6a555ba4-38df-... | 2 | 0 | 0 | | 0 |
| 14f18b0e-c765-... | 1 | 3 | 1 | | 1 |

912

| Key | t13 | t14 | t15 | ... | t97 | t98 | t99 | Time | Label |
|---|---|---|---|---|---|---|---|---|---|
| 99126c36-7660-... | 6 | 0 | 4 | ... | 1 | 0 | 5 | 1559250000000 | 1 |
| 6a555ba4-38df-... | 2 | 7 | 0 | ... | 0 | 0 | 0 | 1559250000000 | 0 |
| 14f18b0e-c765-... | 2 | 3 | 1 | ... | 1 | 2 | 2 | 1559250000000 | 1 |

920

| Key | avgOfAllDays | last3DaysAvg | ... | currentDayAvg |
|---|---|---|---|---|
| 99126c36-7660-... | 8.2040816265306 | 19.1891891891919 | ... | 19.4736842105226315 |
| 6a555ba4-38df-... | 15.173469387755102 | 13.635135135135135 | ... | 0.0 |
| 14f18b0e-c765-... | 18.5 | 19.337837837837844 | ... | 21.3 |

926

| Key | hour_of_day | week | day_of_week | day_of_year |
|---|---|---|---|---|
| 99126c36-7660-... | 10 | 35 | 4 | 242 |
| 6a555ba4-38df-... | 13 | 34 | 3 | 234 |
| 14f18b0e-c765-... | 19 | 31 | 1 | 211 |

928

| Key | zeros | nonZeros | max | min | var | std | median | ... | peaks | autoCorr |
|---|---|---|---|---|---|---|---|---|---|---|
| 99126c36-7660-... | 0.22988505 | 0.77011494 | 0.01659751 | 0.0 | 0.00085071 | 0.02916693 | 0.0125 | ... | 0.0 | 0.57110843 |
| 6a555ba4-38df-... | 0.80459770 | 0.19540229 | 0.00031918 | 0.0 | 3.4649e-07 | 0.00058864 | 0.0 | ... | 0.0 | 0.00692873 |
| 14f18b0e-c765-... | 0.18390804 | 0.81609195 | 0.01659751 | 0.0 | 0.00095925 | 0.03097181 | 0.03 | ... | 0.0 | 0.55147710 |

PREFETCHING AND/OR COMPUTING RESOURCE ALLOCATION BASED ON PREDICTING CLASSIFICATION LABELS WITH TEMPORAL DATA

BACKGROUND

Time series models may be used predict future events based on historical temporal data. Forecasting many (e.g., hundreds of thousands or millions of) different events, with a separate time series model for each type of event, may be cost prohibitive, e.g., in terms of resource consumption.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are provided for prefetching information and/or (pre)allocating computing resources based on predicting classification labels with temporal data. A trained temporal classification model forecasts events (e.g., too numerous for individual modeling) by predicting classification labels indicating whether events will occur, or a number of occurrences of the events, during each of a plurality of future time intervals. Time-series datasets, indicating whether events occurred, or a number of occurrences of the events, during each of a plurality of past time intervals, are transformed into temporal classification datasets. Classifications may be based, at least in part, on extracted features, such as data seasonality, temporal representation, statistical and/or real-time features. Classification labels are used to determine whether to take one or more actions, such as, for example, prefetching information or (pre)allocating a computing resource.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 7A:
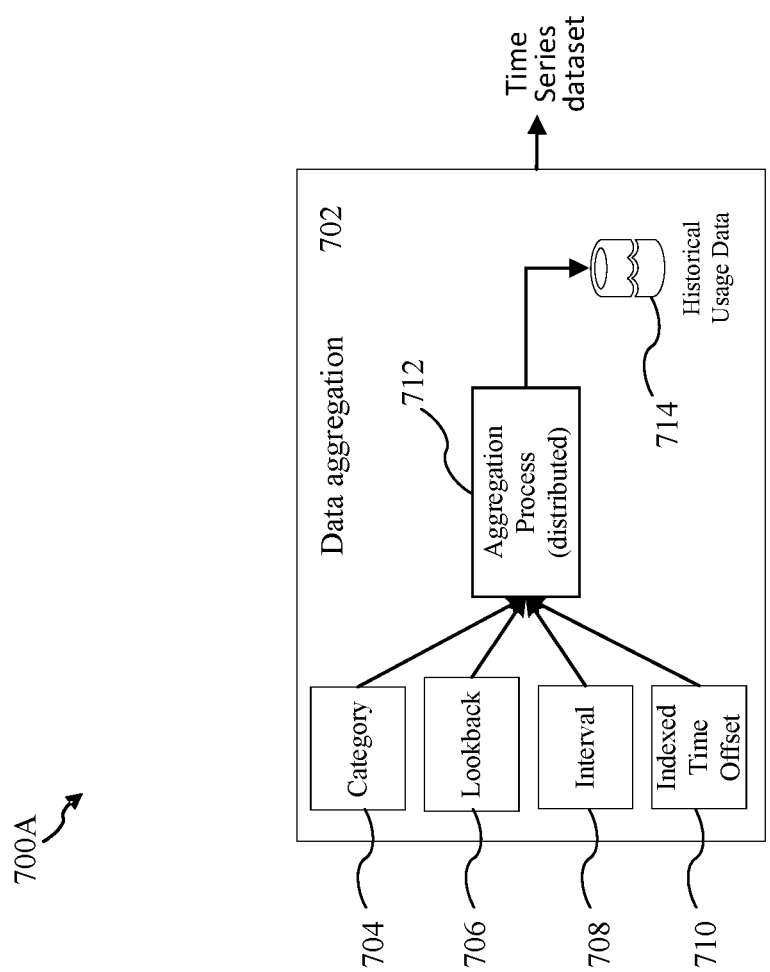
Figure 7B:
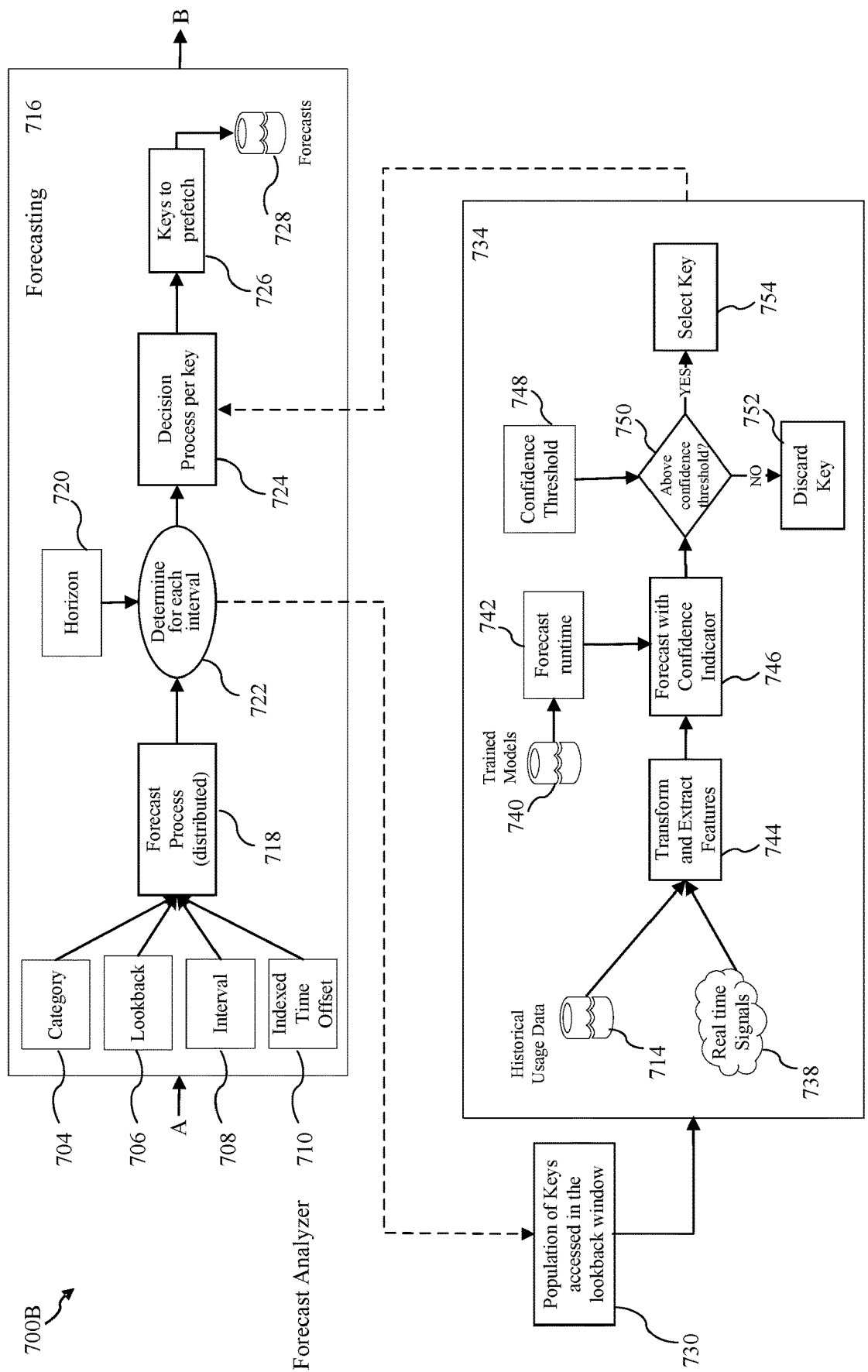
Figure 7C:
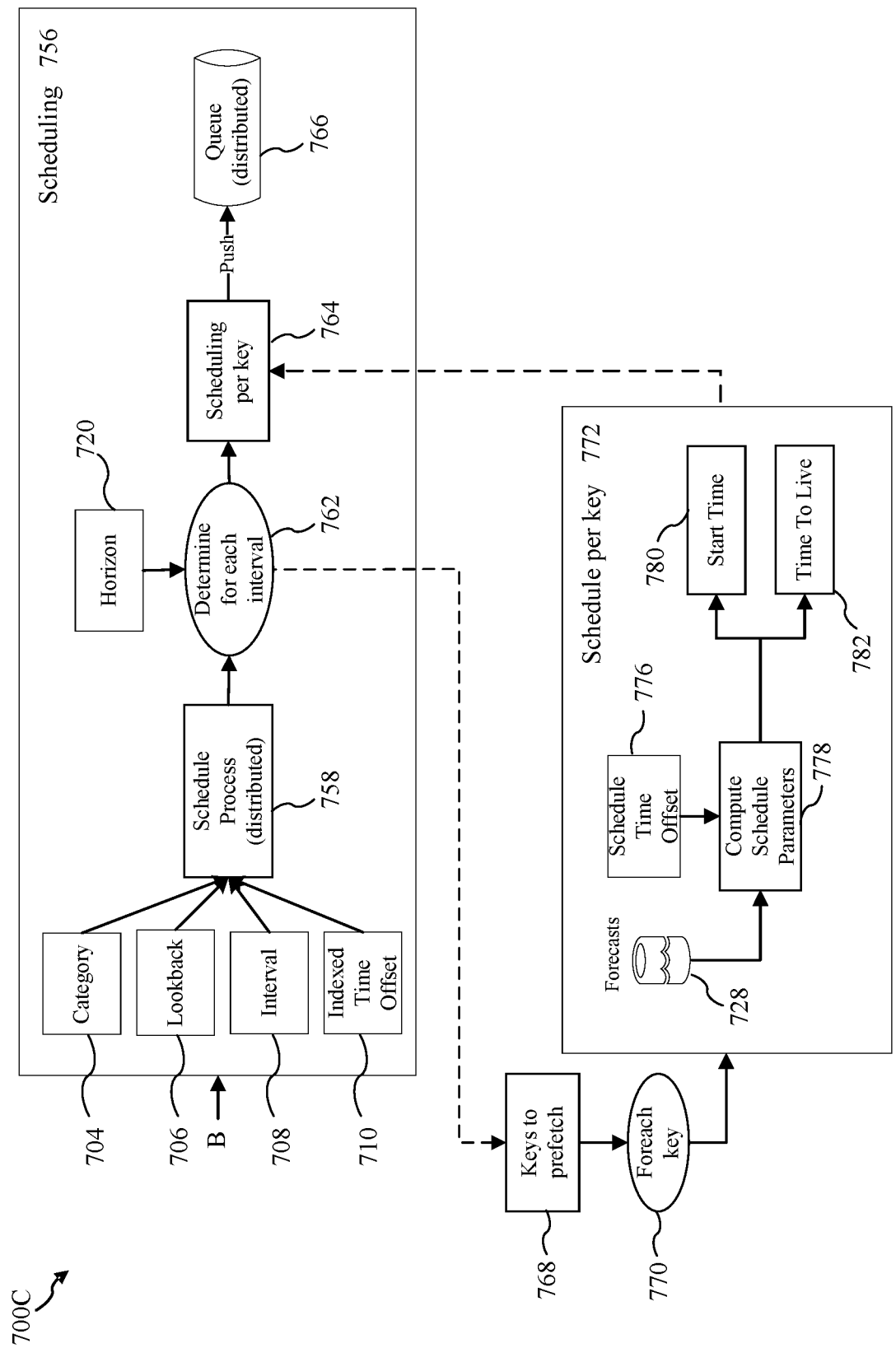

FIGS. 7A-C show an example data and process flow diagram for prefetching with temporal classification based on a time series dataset and driver signals, according to an example embodiment.

Figure 8:
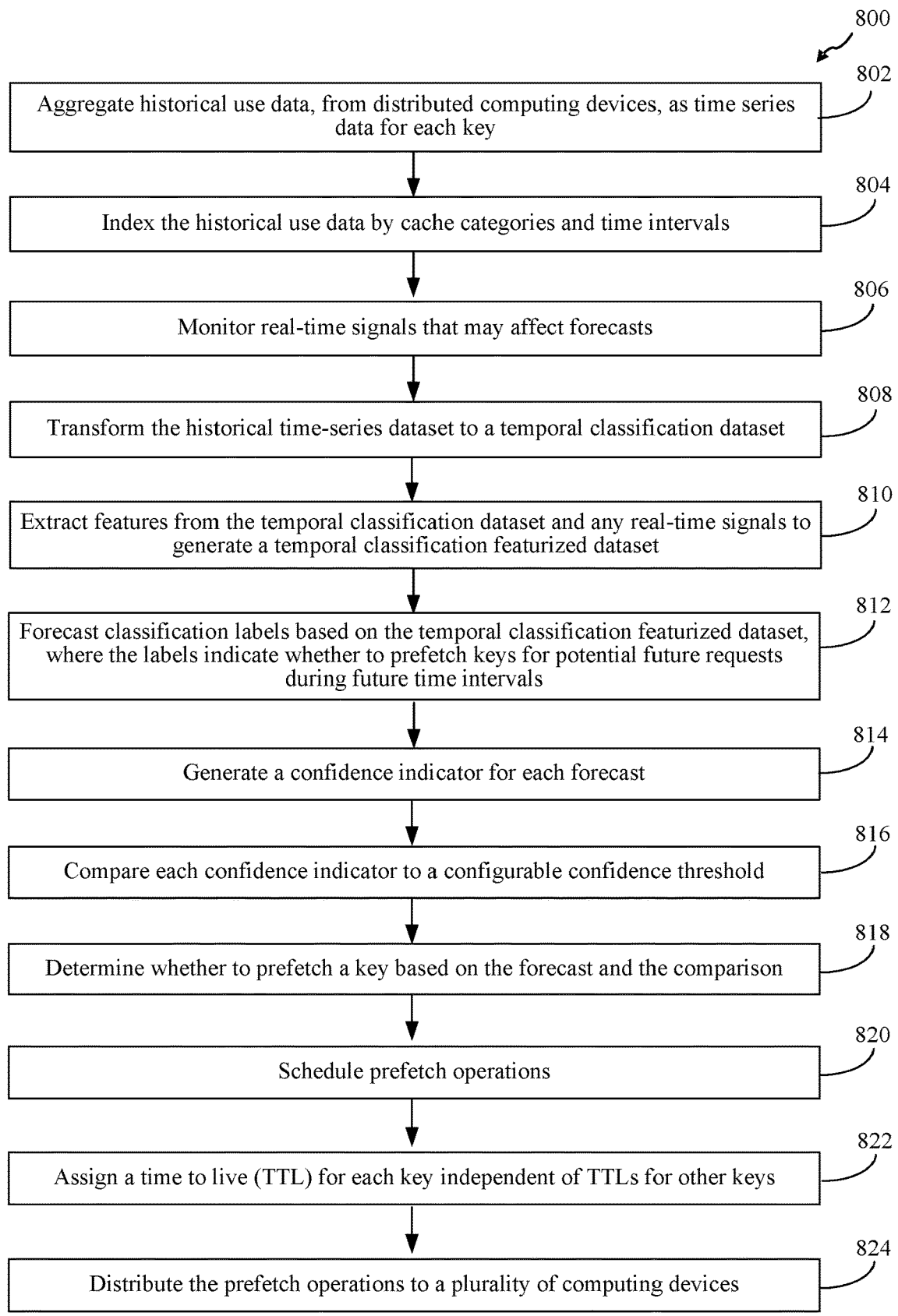

FIG. 8 shows a flowchart of a method for prefetching with temporal classification based on a time series dataset and driver signals, according to an example embodiment.

Figure 9A:
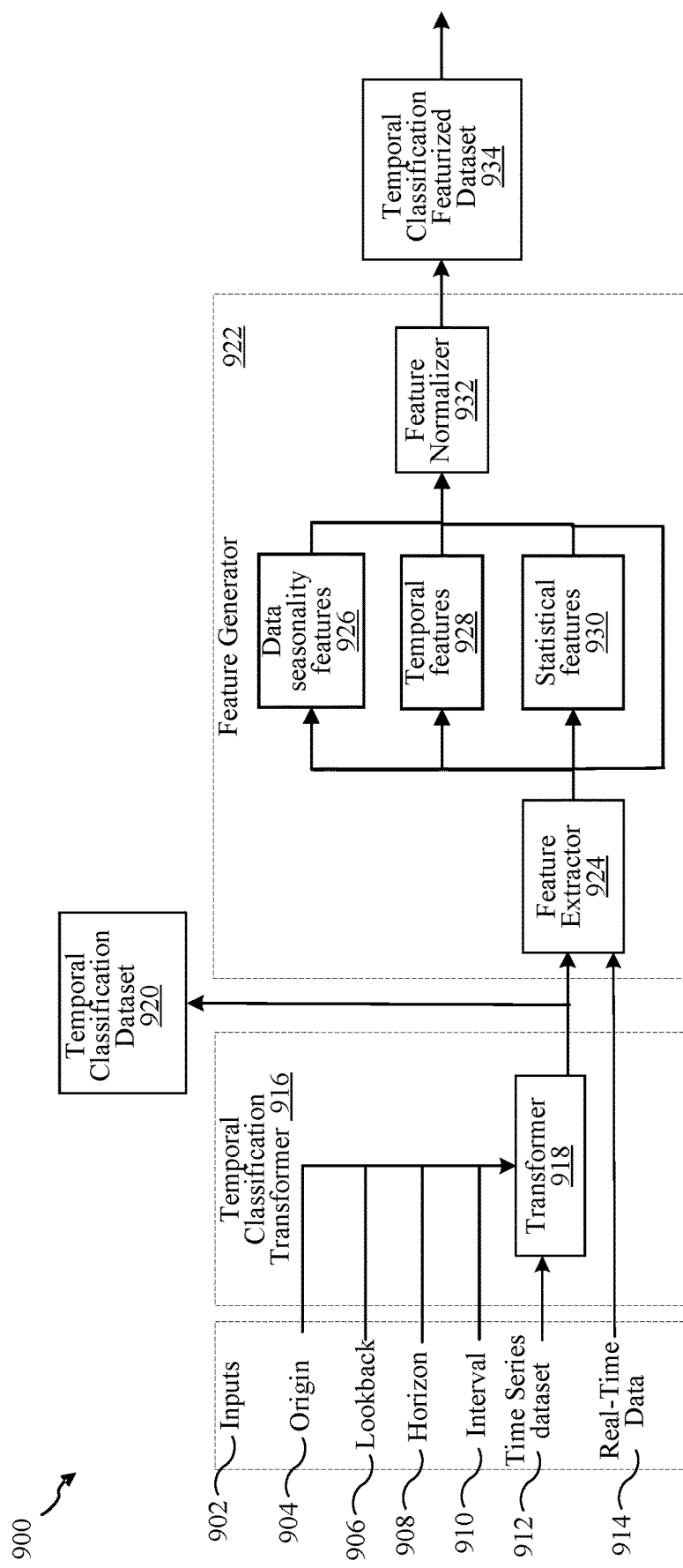

FIGS. 9A and 9B show an example of generating a temporal classification featurized dataset, according to an example embodiment.

Figure 10:
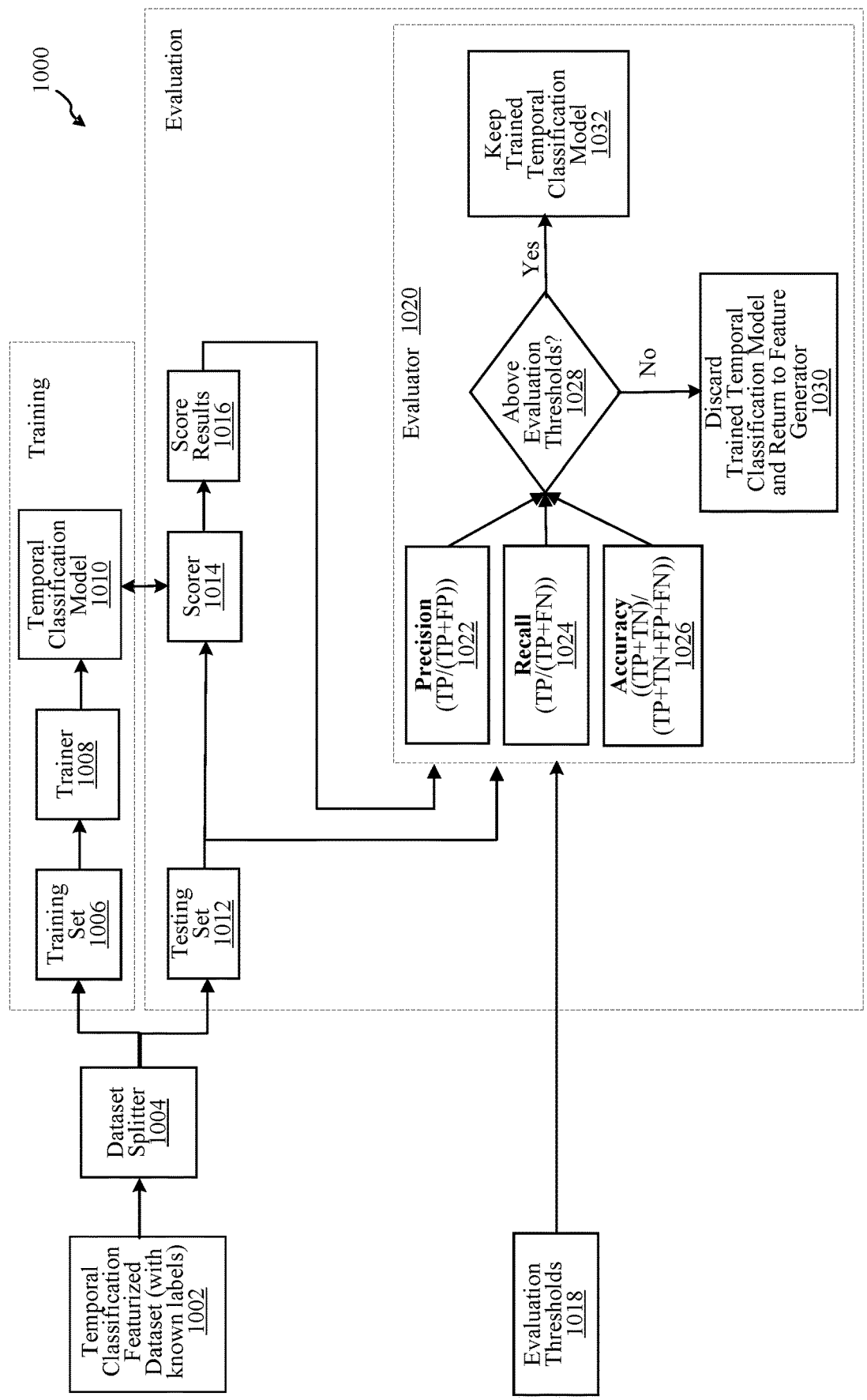

FIG. 10 shows an example of training and evaluating a temporal classification model, according to an example embodiment.

Figure 11:
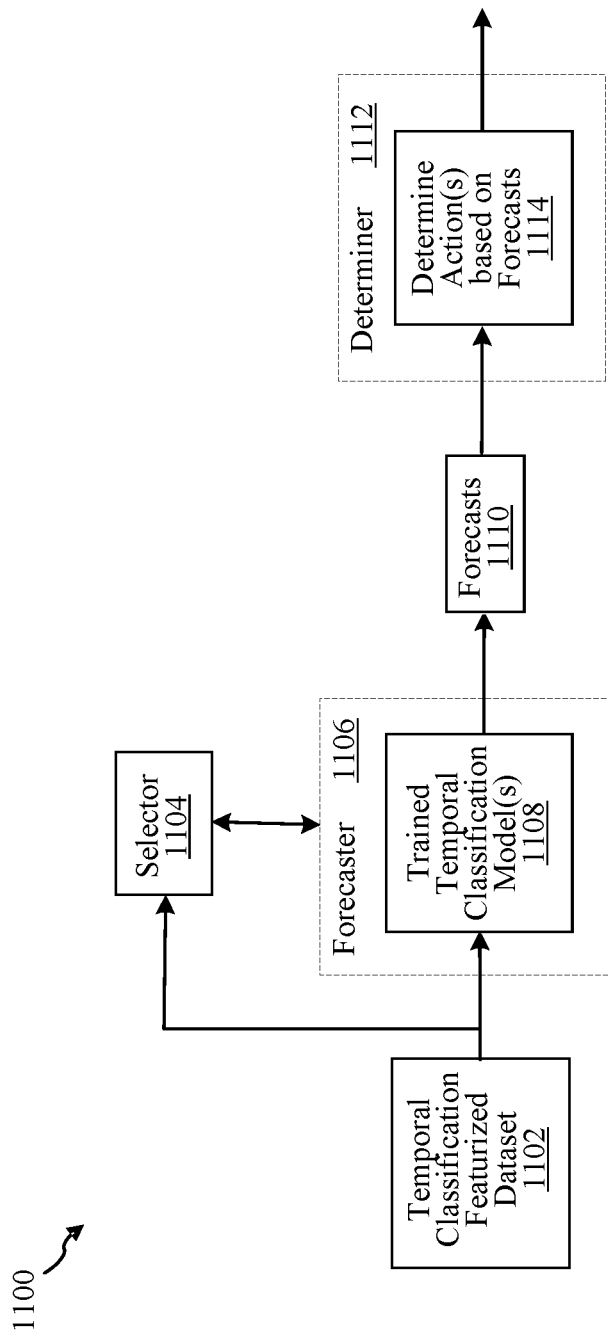

FIG. 11 shows an example of using a trained temporal classification model to predict classification labels for a temporal classification featurized dataset and determine action(s) based on the labels, according to an example embodiment.

Figure 12:
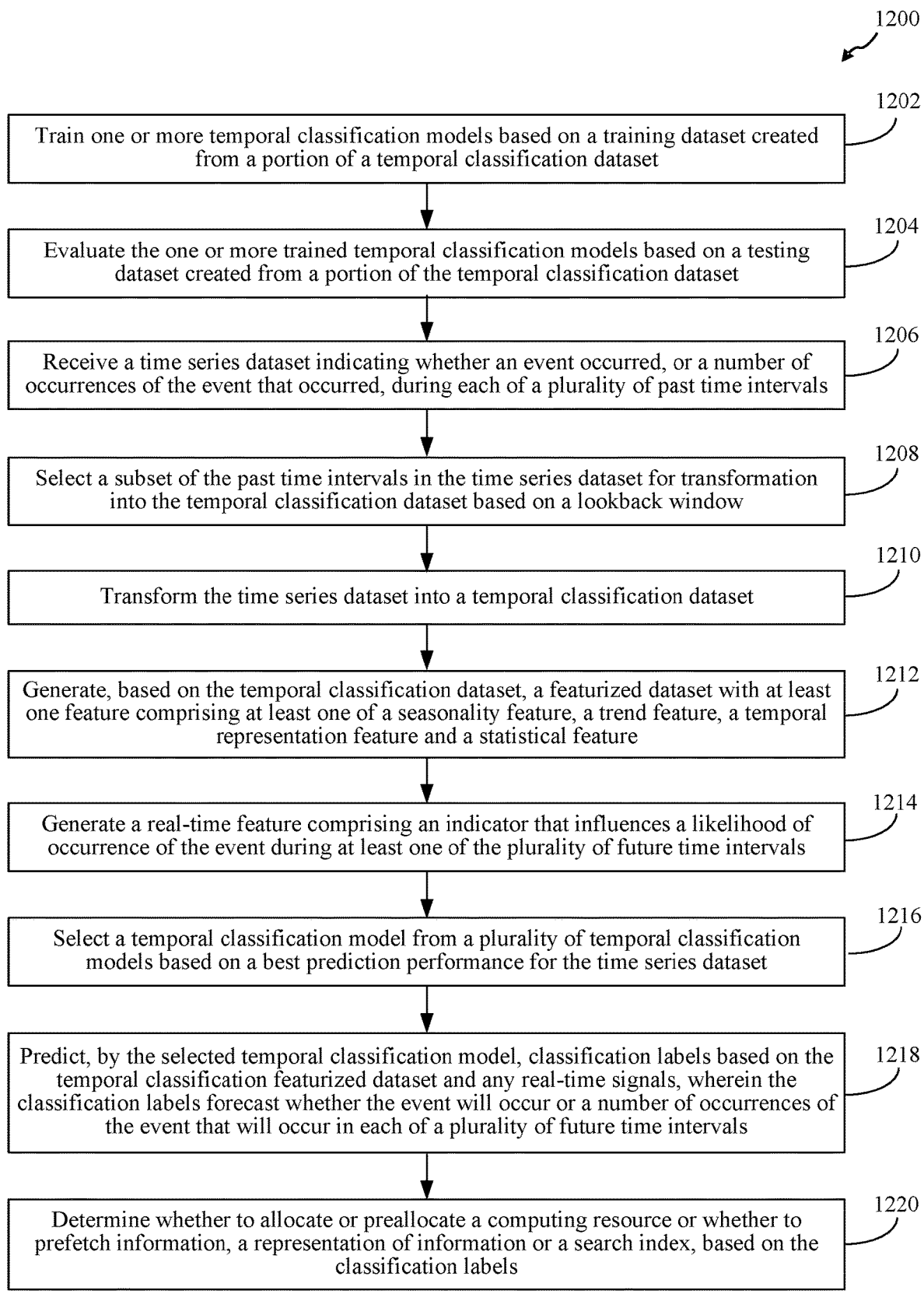

FIG. 12 shows a flowchart of a method for creating and using a model to predict classification labels based on temporal data, according to an example embodiment.

Figure 13:
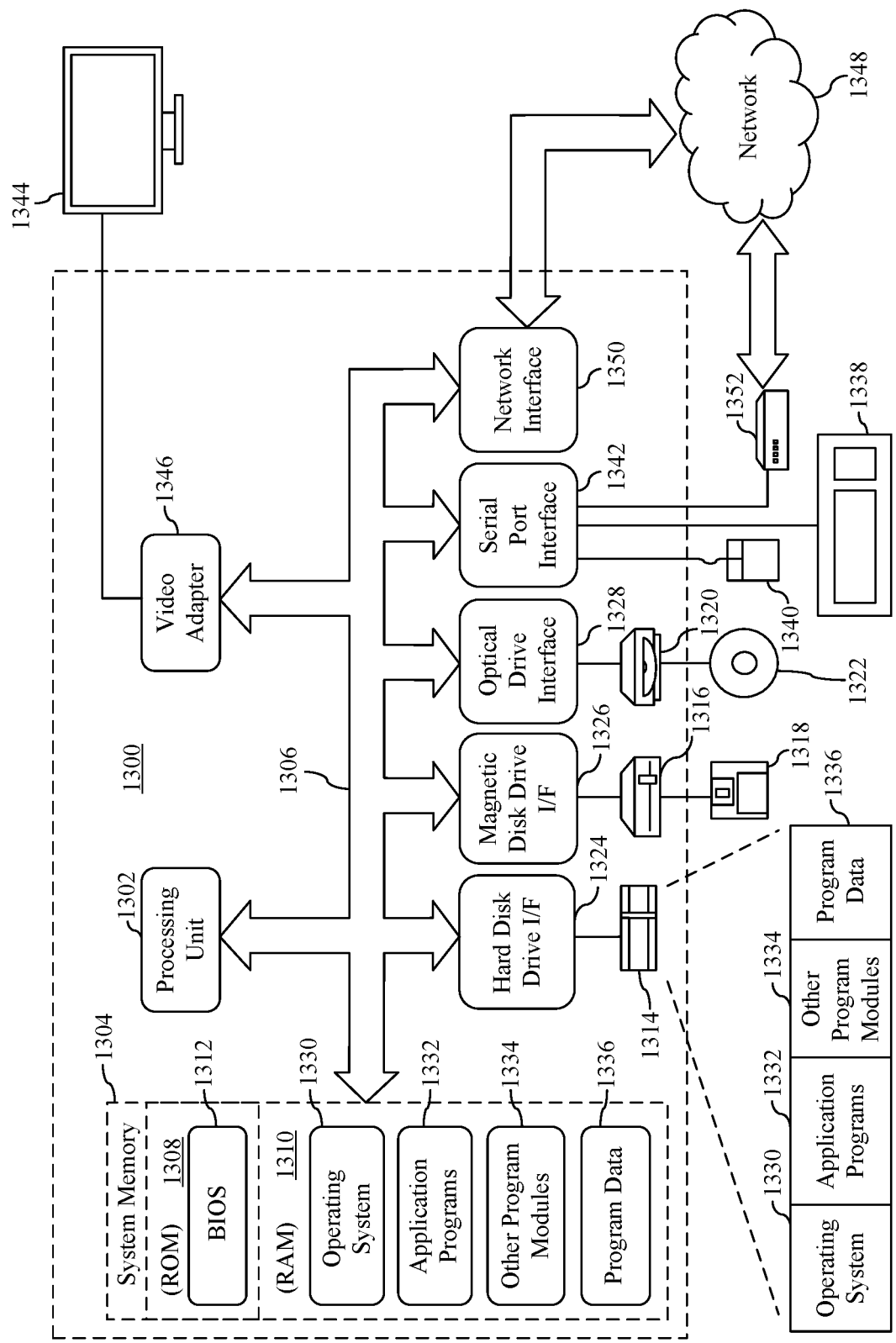

FIG. 13 shows a block diagram of an example computing device that may be used to implement example embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Forecasting one or a few events, such as a weather forecast or network usage, may be implemented by one or a few forecast models based on temporal datasets. However, forecasting thousands, hundreds of thousands, millions or more different, independently occurring, events, which may occur during similar timeframes or even simultaneously, with as many forecast models to make predictions, may be too costly to scale, e.g., in terms of computational resources. Examples of significant numbers (e.g., thousands to millions) of tracked and forecast events may include requests for/use of information, use of search indices for queries, allocation or pre-allocation of computing resources, sale of goods or services, and transportation service pickup locations and times.

In accordance with embodiments described herein, many independent time-series analyses are converted into a common classification analysis. A trained temporal classification model forecasts events (e.g., too numerous for individual modeling) by predicting classification labels indicating whether events will occur, or a number of occurrences of the events, during each of a plurality of future time intervals. Time-series datasets, indicating whether events occurred, or a number of occurrences of the events, during each of a plurality of past time intervals, are transformed into temporal classification datasets. Classifications may be based, at least in part, on extracted features, such as data seasonality, temporal representation, statistical and/or real-time features. Classification labels are used to determine whether to take one or more actions, such as, for example, (pre)allocating a computing resource, prefetching information or a search index, dispatching a transportation service to a geographic area, ordering goods to restock inventory, charging a battery, etc.

Although there are many applications for a temporal classification model, a detailed application example is provided with respect to prefetching information.

Information services, whether running in the cloud or on a device, may use caching mechanisms to index data, e.g., to improve query execution and reduce response times. Cache may (e.g., besides indexing data) store additional data (e.g., metadata), which may be used to serve incoming requests. Outbound requests to remote data sources over one or more networks (e.g., easily tens to hundreds of times slower) may be avoided by caching the data. Response times to requests for information from data servers may be reduced by storing information locally. However, due to limited storage capacity, certain storage policies may be implemented. Data stored in cache may be bound to the size limits and eviction policies, such as least recently used (LRU) and/or a time window (e.g., time to live or TTL). Such storage policies may lead to delays and slower response times by forcing retrieval of information from a remote source. Data may not be available in cache when requested (e.g., a cache miss) due to a failure to cache or LRU, TTL or other cache policies. A cache hit ratio may be improved while conforming to cache size limits and/or eviction policies.

In an example, a datacenter may provide requested information by utilizing a prefetching system to reduce response times. Each independently searched and/or tracked information may be represented by a key. An information retrieval service, such as Microsoft MS Graph service, may serve millions of keys.

A temporal classification model may be trained and configured to forecast whether to prefetch information (e.g., keys responsive to queries) for future time intervals. Training and forecasting may be based on known or historical use during past time intervals, with or without using internal or external signals that may influence forecasts, such as prevailing conditions. A time series dataset including time-series data for each key may be converted or transformed into a temporal classification dataset. Historical use of keys reflected in the dataset may be analyzed for additional features, such as temporal features, statistics features, and/or temporal features, which may include patterns and trends with multiple seasonalities (e.g., per category and/or per key). Time series data and forecasts may be indexed by cache categories and time intervals. Forecast precision indicators, confidence indicators and configurable thresholds may be used to optimize performance. Operations (e.g., data aggregation, transformation, forecasting, scheduling and prefetching) may be distributed among multiple servers. Tasks may be time-distributed by offsets. Cached information (e.g., keys) may be assigned a time to live (TTL) independent of other cached information.

Figure 1:
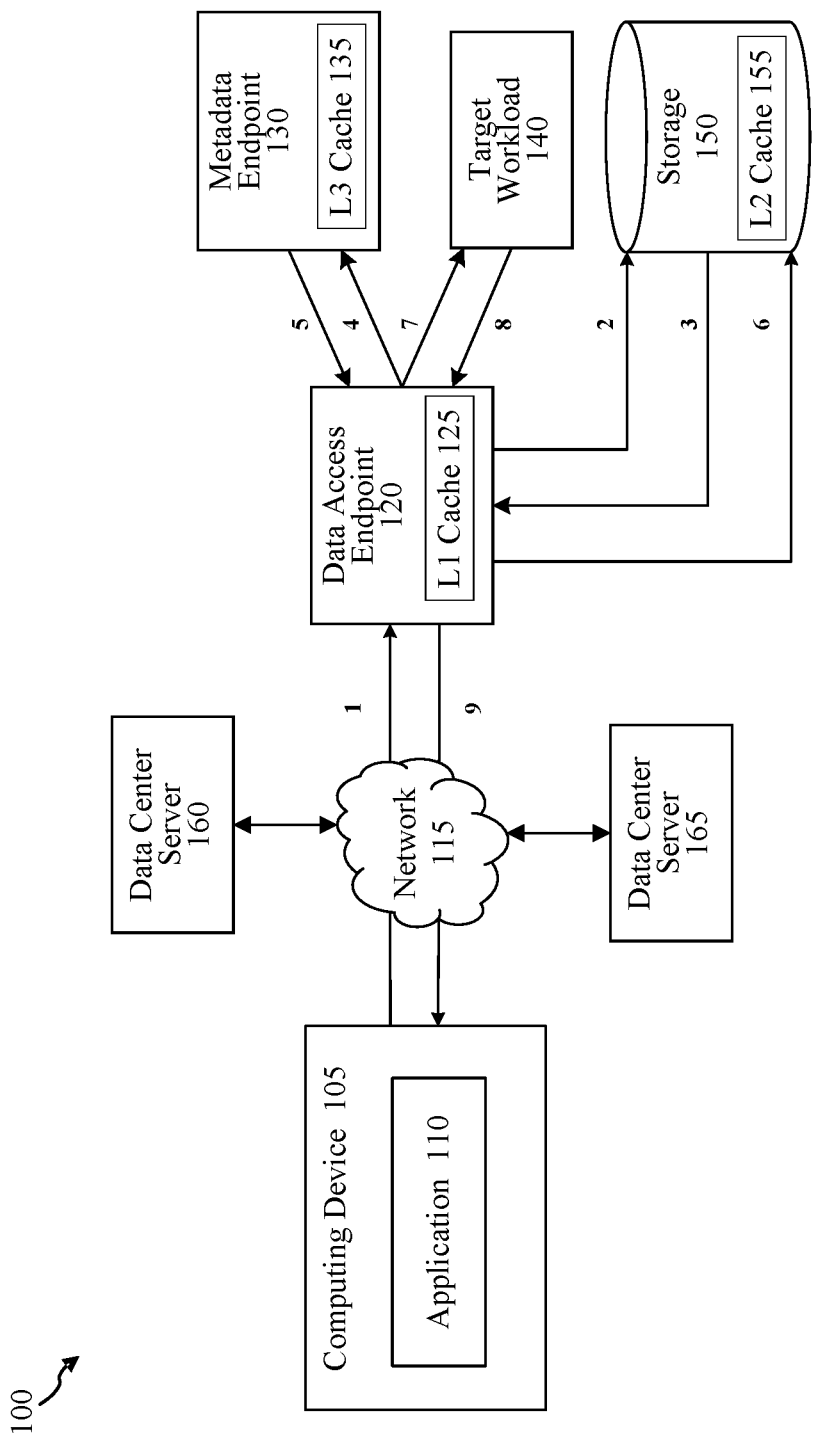
FIG. 1 is a block diagram of an example query response system that may be configured to prefetch information based on classification labels predicted with temporal data, according to an example embodiment.

FIG. 1 is a block diagram of an example query response system that may be configured to prefetch information based on classification labels predicted with temporal data, according to an example embodiment. A temporal classification model may determine classification labels based on a temporal classification dataset (e.g., created from a time-series dataset of historical use) with or without additional parameters (e.g., features), such as real-time signals.

Example system 100 may comprise, for example, computing device 105 executing application 110, network 115, data access endpoint 120, metadata endpoint 130 and target workload 140, storage 150, data center server 160 and data center server 165. A temporal classification model may be implemented, for example, in one or more data center servers. FIG. 1 presents one of many computing environments that may implement subject matter described herein. For example, in an (e.g., alternative) example of a query response system, metadata endpoint 130 (and associated L3 cache 135 and steps 4 and 5) may not be implemented.

Computing device 105 may comprise any computing device. In an example, there may be tens, hundreds, thousands, millions or more computing devices with applications 110 configured to access data access endpoint 120. Computing device 105 may be, for example, any type of stationary or mobile computing device, such as a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 105 may comprise one or more applications, operating systems, virtual machines, storage devices, etc. that may be executed, hosted, and/or stored therein or via one or more other (e.g., networked) computing devices. In an example, computing device 105 may access one or more server computing devices (e.g., over a network). Computing device 105 may comprise application 110. An example computing device with example features is presented in FIG. 13.

Application 110 may comprise any type of application. Application 110 may comprise one or more executable programs, dynamic link libraries (DLLs), etc. Application 110 may use representational state transfer (REST) APIs or software development kits (SDKs), for example, to access and interact with data access endpoint 120. Application 110 may be developed in an application development framework. In an example, application 110 may comprise a .NET (dot-net) application created in a .NET framework. Dot-net is a cross-platform, open source developer platform for building many different types of applications with many different languages, editors and libraries available to build applications for many different environments (e.g., web, mobile, desktop, gaming, and Internet of Things (IoT) environments). Application 110 may interact with a model, integrate a model, support model development, etc. For example, a model associated with application 110 may comprise a machine learning (ML) model developed with ML.NET.

Network 115 may include one or more of any of a local area network (LAN), a wide area network (WAN), a personal area network (PAN), a combination of communication networks, such as the Internet, and/or a virtual network. In example implementations, computing device 105 and data access endpoint 120 may be communicatively coupled via network 115. Data access endpoint 120 and computing device 105 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Data access endpoint 120 may comprise, for example, one or more data access servers, such as one or more Microsoft Graph servers. Data access endpoint 120 may, for example, comprise a front end (FE) of a data center. There may be multiple servers in a data center, such as data center server 160 and data center server 165 (e.g., among other servers and other resources). A workload may be partitioned and distributed among multiple servers, for example, to improve performance (e.g., response time), balance server loading, etc. In an example, data access endpoint 120 may partition and distribute a workload among multiple servers, such as collecting (e.g., aggregating) data, transforming data, analyzing data, executing a prediction model to forecast data that may be requested, determining whether to prefetch data (e.g., metadata) that may be requested, prefetching data and so on.

In an example, data access endpoint 120 may allow application developers to integrate a variety of services and data sources. Data access endpoint 120 may support interactions (e.g., communication) with application 110 (e.g., via computing device 105), metadata endpoint 130, target workload 140 and storage 150. Data access endpoint 120 may provide application programming interfaces (APIs) for application 110 to access data. Data access endpoint 120 may manage storing, processing, and securing and retrieving data responsive to requests from application 110. Data access endpoint 120 may provide information to application 110, for example, to support various scenarios, such as productivity, collaboration, education, machine-learning, model predictions, security, identity, access, and device management. Data access endpoint 120 may provide a set of tools to streamline secure and scalable delivery of data for intelligent applications. Data responsive to requests/queries may be stored in L1 cache 125, L2 cache 155, L3 cache 135 or other data locations. In various implementations, there may be multiple data access endpoints 120, which may share common (e.g., global) L2 cache 155.

L1 cache 125, L2 cache 155 and L3 cache 135 may, for example, store additional data (e.g., metadata), which may be referred to as keys, that may be used to serve incoming requests. In an example, a key may be used to construct a response to one or more requests. Cache entries of keys may be divided into categories. In an example, a first category may map user IDs to principal names. TTLs for cached keys may be configured per category and/or per key, for example.

L1 cache 125 may comprise local cache (e.g., cache for each virtual machine (VM)). L2 cache 155 may comprise, for example, distributed (e.g., Redis) cache for each region. L3 cache 135 may comprise, for example, metadata source cache, which may be located anywhere. Each of multiple cache categories may map to a different metadata type.

Step numbers 1-9 show an example procedure where application 110 makes a request (1) and data access endpoint 120 provides a response (9). Data access endpoint 120 may search L1 cache 125 for responsive information before checking L2 cache 155 (steps 2, 3), L3 cache 135 (steps 4, 5) or generates target workload 140 (steps 7, 8) to retrieve or generate information. Step 6 may indicate an operation to cache metadata returned from metadata endpoint 130 in (e.g., global) L2 cache 155, for example, to make it available globally to (e.g., all) data access endpoints (e.g., data access endpoint 120).

Metadata endpoint 130 may comprise a source of metadata. Metadata endpoint 130 may comprise, for example, one or more data access servers. Endpoint resource types such as metadata endpoint 130 may represent URLs for resources associated with an entity, such as L3 cache 135. Metadata endpoint 130 may cache data, such as metadata, in L3 cache 135. Metadata endpoint 130 may support interactions with data access endpoint 120, for example, to provide metadata from L3 cache 135 that was not found in L1 cache 125 by data access endpoint 120.

Target workload 140 may be generated by data access endpoint 120, for example, to obtain or generate information responsive to a request/query, e.g., when data access endpoint 120 does not find information responsive to a request in cache (e.g., L1 cache 125, L2 cache 155 or L3 cache 135). Data returned by target workload 140 may be cached (e.g., L1 cache 125, L2 cache 155 or L3 cache 135).

Storage 150 may comprise one or more storage devices. Storage 150 may comprise cache (e.g., L2 cache 155). Storage 150 may store data and/or programs (e.g., information). Data may be stored in storage 150 in any format, including tables. Storage 150 may comprise, for example, an in-memory data structure store (e.g., Redis) implementing a distributed, key-value database, which may support, for example, data structures such as strings, hashes, lists, sets, sorted sets with range queries, bitmaps, hyperlog logs, geospatial indexes with radius queries and streams.

Steps 2-8 pertaining to cache misses in L1 cache 125, L2 cache 155 or L3 cache 135 serve to demonstrate that it is preferable to accurately predict requests, prefetch and store information responsive to requests (1) in L1 cache 125, for example, to avoid delays associated with steps 2-8.

Cache misses (e.g., in L1 cache 125, L2 cache 155 or L3 cache 135) may be reduced (e.g., to avoid steps 2-8) and improve performance (e.g., reduce response latency), for example, by implementing a cache prefetch system, which may operate in the background to cache keys before data access front ends receive requests. Prefetching decisions and cached keys (e.g., for future requests) may be based on classification labels predicted by a temporal classifier model, which may process a temporal classification dataset created from a time series dataset (e.g., historical requests and/or responsive information, such as keys accessed) alone or in combination with real-time signals (e.g., drivers) that may influence future requests. Prefetch decisions may account for drivers that influence predictions based on historical usage, such as real-time signals. A temporal classification model may comprise one or more machine learning (ML) models, which may be created, trained and implemented, for example, using ML.NET. Different models may be selected and used, for example, based on one or more historical and/or real-time features or parameters.

Figure 2:
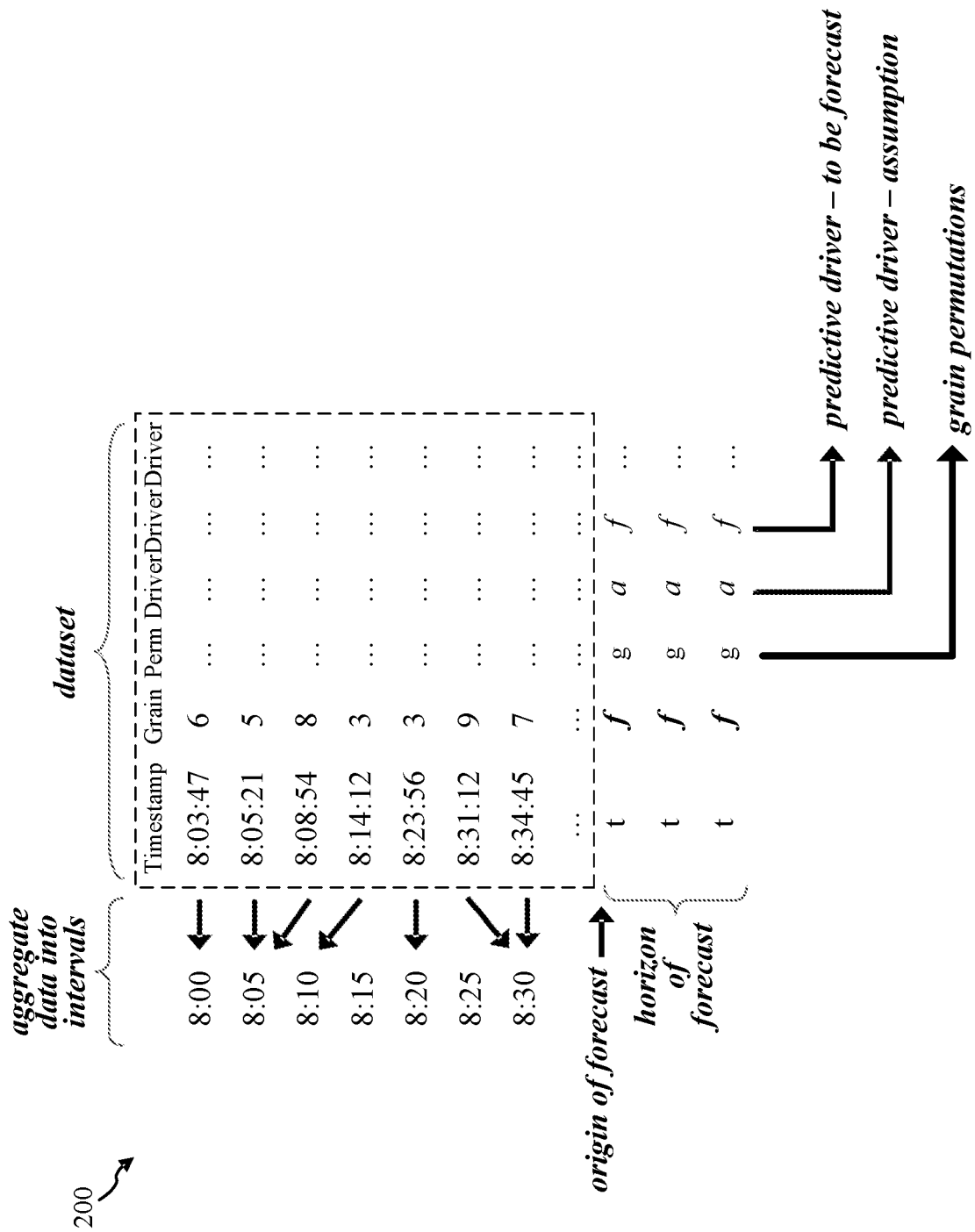
FIG. 2 is an example of a temporal dataset that may be used to forecast events in future time intervals to determine prefetching, according to an example embodiment.

FIG. 2 is an example of a temporal dataset that may be used to forecast events in future time intervals to determine prefetching, according to an example embodiment. Example 200 shows an example of a timestamped time-series dataset that may be transformed into a temporal classification dataset. A time-series dataset may comprise information, such as, for example, a timestamp, a grain, a permutation, a driver, etc.

A time-series dataset may pertain to one or more categories and/or keys in one or more categories. A time-series dataset may provide a lookback into the past over a number of past time intervals. Past time interval values may be converted into features used by a temporal classification model to predict values for future time intervals in a forecast process. A lookback may be timeless, bound to computational limits to process the data. In an example, a lookback may comprise a rolling window. For example, a rolling window of a number of days, weeks or months may be used to detect seasonality. Seasonality (e.g., in time series data) may indicate patterns or variations that occur at recognizable intervals (e.g., hourly, daily, weekly, monthly, quarterly request patterns). A timestamp for a data entry in a dataset may comprise, for example, a time that an entry in a dataset was generated. A grain (g) may comprise the number of times a key (e.g., hashed metadata) was accessed in a time window/interval (e.g., to respond to a request). A grain may have permutations. A forecast (f) may be provided for a (e.g., each) permutation of grain values. A driver may comprise an internal or external signal (e.g., a real time signal) that may influence an access pattern of a given category or key. Predictive drivers may include known or estimated assumptions (a). Predictive drivers may be predicted in a forecast, for example, based on training data.

Data in a time-series dataset may be prepared or transformed into a temporal classification dataset for a temporal classification model. A time interval may be used to aggregate and index data on (e.g., fixed) intervals. In an example, timestamped data may be aggregated, for example, in 5-minute interval samples. Sampling (e.g., aggregating) data in (e.g., time) intervals (e.g., without sacrificing too much resolution) may, for example, reduce computation cycles, consumption of memory and storage resources in a forecast process and improve the overall performance of a model, without compromising the accuracy of results. For example, assuming a minimum time to live (TTL) for prefetched keys in a given category is 1 hour, a system may be configured to aggregate data in 30 minutes intervals. In the example shown in FIG. 2, data in the dataset is aggregated into five-minute intervals for processing by a temporal classification model. Data intervals may be increased, for example, during transformation from a time-series dataset to a temporal classification dataset, e.g., by aggregating values in smaller intervals into larger intervals.

Figure 3:
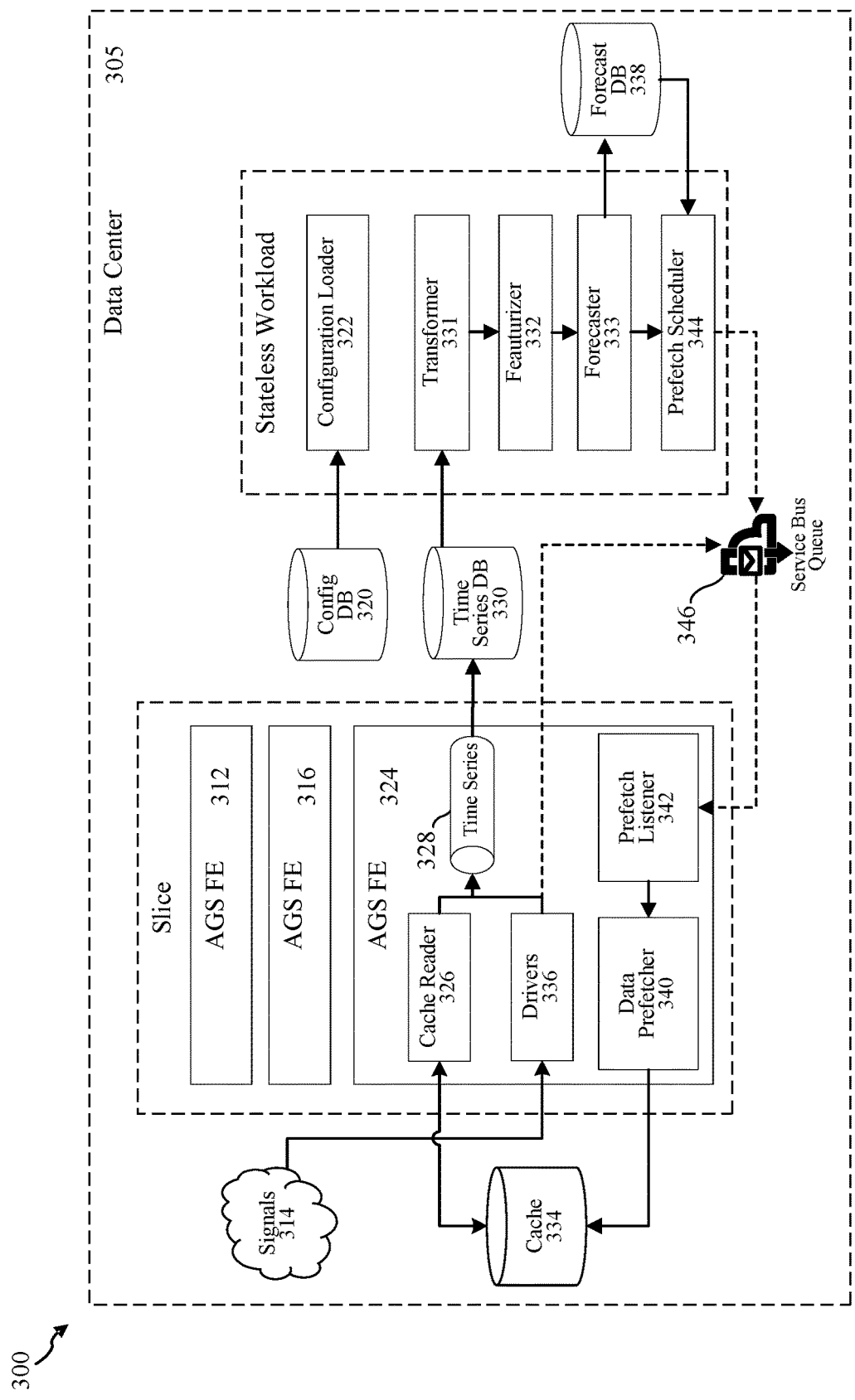
FIG. 3 is a block diagram of an example prefetching architecture with temporal classification based on a time series dataset and driver signals, according to an example embodiment.
Figure 4:
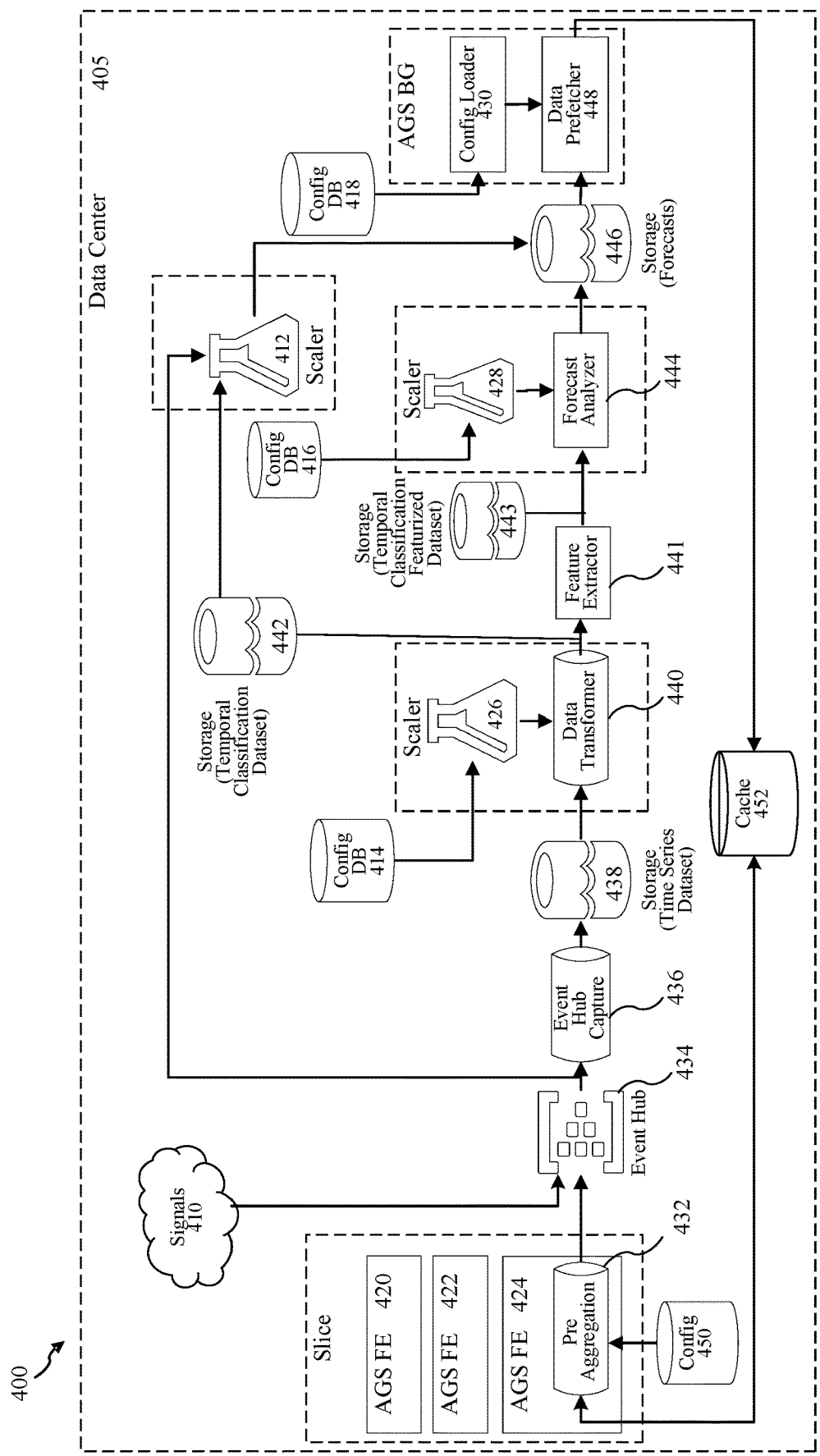
FIG. 4 is a block diagram of an example prefetching architecture with temporal classification based on a time series dataset and driver signals, according to an example embodiment.
Figure 5:
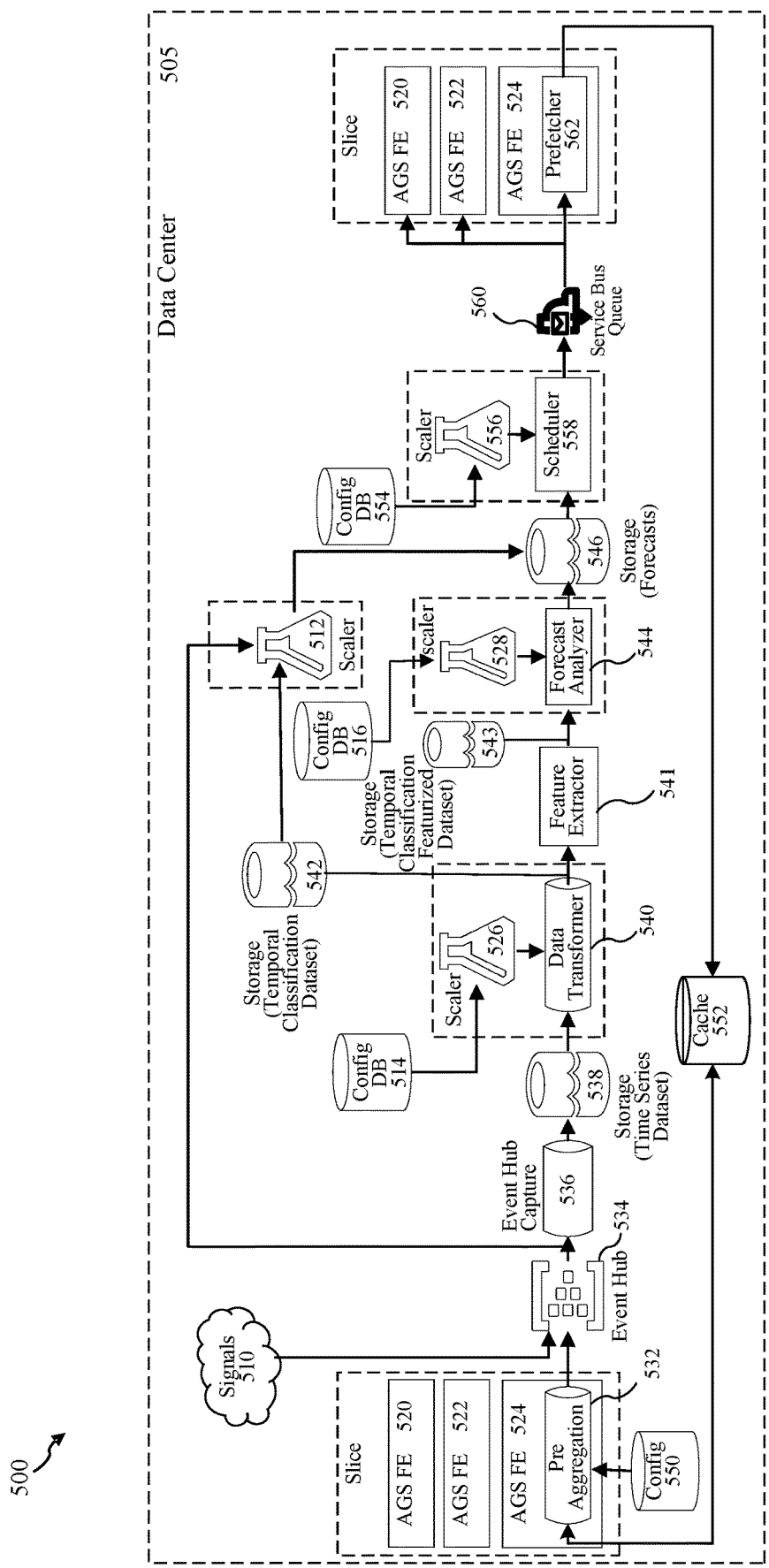
FIG. 5 is a block diagram of an example prefetching architecture with temporal classification based on a time series dataset and driver signals, according to an example embodiment.

FIGS. 3-5 present example architectures for cache prefetching based on a temporal classification dataset (e.g., created from a time-series dataset of historical use) with or without additional parameters (e.g., features), such as real-time signals. FIGS. 7A-C present example data flow diagrams followed by an example flowchart for the prefetching example implementation of a temporal classification model.

A prefetch system may prefetch keys (e.g., that may be needed in upcoming time windows) based on classification labels generated by a temporal classification model using a temporal classification dataset (e.g., created from a time-series dataset) with or without real-time signals. Access patterns may be determined by category and/or by key. Caching decisions (whether to prefetch a key, TTL) may be category and/or key specific. In an example, an access pattern for a category or specific key may follow a business hours trend (in local time). Different keys under the same category may have different access patterns. Access patterns may change (e.g., significantly) over time and/or based on influences (e.g., drivers), such as weather events and holidays. A model may be dynamic and may auto correct based on historical data and other contextual signals, e.g., on a per-category and/or a per-key basis.

Prefetching determinations may be similar to weather forecasting, for example, where future weather may be predicted using historical temperature data, e.g., along with other data points, such as precipitation, humidity, wind, etc. In a machine learning domain, temperature data may be called a grain while additional (e.g., influential) data points may be called drivers. While temperature data (e.g., alone) may generate accurate predictions, other factors (e.g., drivers) that influence weather may improve the accuracy of weather predictions. Multiple variables (e.g., grain and one or more drivers) may be considered in a multivariate analysis, which involves observation and analysis of more than one statistical outcome variable at a time.

A temporal classification model may be referred to, variously, as a forecast model, a forecast analyzer, a forecaster, a model, or combinations thereof. A trained model may be selected from among multiple trained models, for example, based on performance for one or more identifiable features (e.g., patterns in features or a specific feature, such as data seasonality).

A model may be optimized for short term prediction, for example, when cached requests may be short-lived with short TTLs. Seasonality may be detected, for example, based on seasonality patterns in requests (and/or key use). Seasonality may indicate, for example, usage patterns during business hours that slow outside business hours. Trends may be detected, for example, based on drivers. Cross-prediction may be performed, for example, based on similar information. In an example, keys with similar or identical patterns may be identified as being in the same cache category. A model may be trained with separate but related series, permitting the resulting (e.g., trained) forecast model to predict the outcome of one series based on the behavior of another series, improving model applicability and scalability.

Models may be optimized for one or more groups of features. A forecast may have an origin that begins where a dataset ends. An origin may be set to the past, for example, to test forecasting against actual key use. Forecasting (e.g., what keys may be used) in the future for one or more time windows may be referred to as a horizon.

Training data (e.g., for a model) may be used to find a best performing model for a set of features. A model may be trained by a training dataset (e.g., a temporal classification dataset created, at least in part, from a time-series dataset). A training dataset may comprise a collection of observations (e.g., requests and/or key usage). Predictions may be made for new data when an actual outcome may not be known until a future time. Observations may be treated the same or differently in an analysis. Temporal dynamics may overcome "concept drift," such as by using more recent (e.g., last week, month or year of) observations rather than all data available. A time series dataset may differ from other datasets, for example, by having a time dimension. A time series may have an explicit order dependence between observations. A time dimension may comprise a constraint and a structure that provides a source of additional information. A time-series dataset may be transformed into a temporal classification dataset. Additional features may be generated, for example, based on information in the dataset, and added to the dataset (e.g., creating a temporal classification featurized dataset).

A prefetch system may operate at large scale, for example, by distributing prefetch system operations. Prefetch operations (e.g., data aggregation, transformation, forecasting, scheduling and prefetching) may be scalable. Prefetch operations may be distributed among multiple computing devices (e.g., datacenter servers). Prefetching may not be bound to hardware or storage limitations, which may permit efficient processing of very large datasets while analyzing many different requests and keys for prefetch caching operations.

A key may index one or more queries/requests. The value of or in a key may comprise data that may be used to serve a query/request without obtaining the data from a source. A prefetch system may capture a timestamp for each key use/request. This may support a time-series representing the number of times each key is requested in a time window. Time series analysis may be used to predict if and when each key may be requested. Each cached key may have a TTL, which may be different from TTLs for other keys.

Forecast models may be associated with precision indicators while classification labels (e.g., for forecast keys) may be associated with confidence indicators. Indicator values may be normalized, for example, ranging between 0 and 1. These indicators compared to configurable thresholds may influence prefetch decisions, or other determinations to take one or more actions in other implementations of a temporal classifier model.

Historical use analyses may identify keys that were not accessed recently or as frequently in a prefetch system. Prefetch operations may be based on or bound to each specific time window where keys may be used. Usage of each key may be analyzed (e.g., independently, in real-time) to develop additional features, such as usage patterns, seasonality, and trends, for analysis by a model to forecast (e.g., by classification labels) time windows where each key may be used. Multiple levels of seasonality may be determined (e.g., hourly, daily, weekly, monthly, quarterly) and associated with temporal classification data for each key.

A prefetch system may use internal and external signals that can influence predictions based on usage patterns. An example of an internal signal may be an event or series of events that may (e.g., be known to) trigger one or more (e.g., a sequence of) subsequent events (e.g., influx of certain requests or reducing requests). Such a signal may be used to make prefetch determinations (e.g., to prefetch keys to serve requests stemming from subsequent events from the cache). An example of an external signal may be, for example, local weather, global events (e.g., political, sporting, entertainment, world news) or holiday season. These signals may influence usage patterns of incoming requests.

A prefetch system (e.g., as presented herein) that generates a time-series dataset for each key, for example, in conjunction with internal and external signals, and that converts time-series data into a temporal classification dataset for a model may (e.g., more accurately) capture the entire population of keys in the cache and (e.g., better) react to (e.g., sudden) changes that may result in prefetch deviations, attaining a higher cache hit ratio. Advantages may include a better user experience, for example, by speeding up query execution and/or by reducing operational costs.

FIG. 3 is a block diagram of an example prefetching architecture with temporal classification based on a time series dataset and driver signals, according to an example embodiment. Prefetching (e.g., for L1 cache 125) may be implemented, for example, in multiple stages, such as, for example, data aggregation, data transformation, forecast analysis, prefetch scheduling and prefetching.

Example architecture 300 may be implemented, for example, by datacenter 305 comprising one or more data center servers, e.g., as shown by example in FIG. 1. As indicated in example architecture 300, a (e.g., each) server may be sliced into multiple virtual private servers (VPSs), each slice comprising a portion of available resources, for example, to process one or more workloads and/or to serve one or more customers/tenants (e.g., based on one or more SLAs). A slice may comprise multiple API gateway service (AGS) frontends (FEs), e.g., 312, 316, 324, on one or more data servers. As indicated in example architecture 300, work (e.g., stateless workload) related to determining what and/or when to prefetch may be distributed among one or more servers. In an example, AGS FE 324 may comprise cache reader 326, time series 328, drivers 336, data prefetcher 340 and prefetch listener 342. A stateless workload may comprise category configuration loader 322, forecast analyzer 332 and prefetch scheduler 344. AGS FEs 312 and 316 may be similarly configured.

In an example architecture (e.g., as shown in FIG. 3), time series data aggregation may be implemented, for example, by multiple AGS FEs, e.g., 312, 316, 324. In an example, each AGS FE 312, 316, 324 may aggregate a count of cache reads per category and key and stream that data in the background on a periodic basis. For example (e.g., in AGS FE 324), cache reader 326 may aggregate historical key use data from cache 334 and drivers 336 may aggregate real-time signals 314.

Signals 314 may provide insights that affect prefetch operations. For example, a signal may result in a time window shift or may eliminate prefetching of a key. In an example of (e.g., transformation and/or featurization) logic that may analyze historical use data and real time data to transform time-series data into a temporal classification dataset or add features to the dataset, signals 314 may represent current or prevailing conditions, such as an emergency that closed businesses for hours or for one or more days, which may reduce the likelihood that one or more requests will occur (e.g., as may be forecast based on historical data alone) and, therefore, reduce or eliminate a need for prefetched keys.

Cache reader 326 may aggregate usage data per category and per key.

Aggregated historical key use data and real time signals may be merged into a time-series data stream by time series 328 and stored in time series database (DB) 330. Historical use data and real-time (e.g., driver) signals may be transformed (e.g., into a format accepted by a prediction model), for example, by indexing information in time series DB 330 based on category and time intervals, e.g., aggregated by key.

Time series data for each key or group of keys may be converted in preparation for a (e.g., binary) classifier to forecast whether to prefetch keys or groups of keys for future time intervals. For example, transformer 331 may transform time series dataset 328 stored in time series DB 330 into a temporal classification dataset, which may be stored. Featurizer 332 may extract features from the temporal classification dataset. Featurizer 332 may generate a temporal classification featurized dataset, which may be stored.

Forecast analysis and prefetch scheduling workloads may be distributed among servers (e.g., in datacenter 305). Forecast analysis may occur in a background process, for example, to predict and prefetch for upcoming time windows. Forecaster 333 (e.g., temporal classification model) may process classification features based on time series use data and driver signals per category or key and per time interval to generate classification labels indicating what keys to prefetch for what time intervals. Forecaster 333 may be configured and trained and reconfigured and/or retrained (e.g., as needed) to generate classification labels that satisfy one or more performance criteria. In an example, different models and/or different features may be utilized to forecast, for example, based on different features, such as time intervals, real-time data, etc. Configurations for transformer 331, featurizer 332 and/or forecaster 333 may be stored in configuration database 320. Configuration loader 322 may configure transformer 331, featurizer 332 and/or forecaster 333 as needed (e.g., with appropriate transformation logic, featurization logic and/or model to forecast for a respective set of features) based on configurations retrieved from configuration database 320. The results of forecasting may be stored in forecast DB 338.

Prefetch scheduler 344 may schedule prefetching prior to a predicted request window. Prefetch scheduler 344 may retrieve forecasting results from forecast DB 338. Prefetch scheduling may occur in a background process. In an example, prefetch scheduler 344 may schedule messages on service bus queue 346. A (e.g., each) message posted to service bus queue 346 may comprise, for example, a list of keys to prefetch, an enqueued timestamp (e.g., indicating when the message becomes visible) and a TTL (e.g., indicating a time interval the message is valid for before it is removed from the queue). Message scheduling times may be distributed or spread over a time window, for example, to avoid spikes in prefetch operations.

Prefetching operations for a prefetch load may be spread across multiple AGS FEs, e.g., 312, 316, 324, that process messages (e.g., on a first come, first serve basis) from service bus queue 346 as they become visible. In an example, prefetch listener 342 may provide prefetch messages to data prefetcher 340 as they become visible on service bus queue 346. Data prefetcher 340 may prefetch requested keys and store them in cache 334. In an example (e.g., with reference to FIG. 1), cache 334 may represent L1 cache 125. Data access endpoint 125 may (e.g., first) search L1 cache 125 for a key to construct a response to a request received from application 110.

An AGS FE may receive an operation that may be (e.g., statically) deemed a first operation of a predictable (e.g., well-known) sequence of operations, where any cacheable data to serve the upcoming operations may be (e.g., immediately) queued to prefetch. In an example, (e.g., static) signals 314 may come from AGS FEs and bypass the forecast pipeline, immediately resulting in operations to prefetch data. For example, an operation to create a group may precede a sequence of (e.g., predictable) operations, such as adding users to the group; creating/accessing files; creating/accessing messages. Metadata cacheable to serve those (e.g., predictable) upcoming operations may be retrieved and cached (e.g., immediately), bypassing the forecast pipeline (e.g., and avoiding overhead involved in going through the pipeline).

FIG. 4 is a block diagram of an example prefetching architecture with temporal classification based on a time series dataset and driver signals, according to an example embodiment. Prefetching (e.g., for L1 cache 125) may be implemented, for example, in multiple stages, such as, for example, data aggregation, data transformation, forecast analysis, prefetch scheduling and prefetching.

Example architecture 400 may be implemented, for example, by datacenter 405 comprising one or more data center servers, e.g., as shown by example in FIG. 1. As indicated in example architecture 400, various prefetch operations may be distributed among one or more servers. A (e.g., each) server may be sliced into multiple VPSs, each slice comprising a portion of available resources, for example, to process one or more workloads and/or to serve one or more customers/tenants (e.g., based on one or more SLAs). A slice may comprise multiple API gateway service (AGS) frontends (FEs), e.g., 420, 422, 424, on one or more data servers.

In an example, data aggregation may be implemented, for example, by multiple AGS FEs, e.g., 420, 422, 424. In an example, each AGS FE 420, 422, 424 may aggregate a count of cache reads per category and per key. For example (e.g., in AGS FE 424), pre-aggregation 432 may aggregate historical key use data from cache 452. Pre-aggregation 432 may be configured by config 450, for example, regarding what historical data to collect for particular categories or keys. In an example, pre-aggregation 432 may be configured and reconfigured to collect data for different categories, keys and/or models (e.g., forecast analyzers). Aggregated historical data may be provided (e.g., streamed) to event hub 434. Driver signals 410 may (e.g., also) be provided (e.g., streamed) to event hub 434. Event hub 434 may comprise a streaming platform and event ingestion service. Event hub 434 may, for example, receive and process millions of events per second.

Historical use data and driver signal data sent to event hub 434 may be streamed to event hub capture 436 for storage (e.g., as a time series) in storage 438. In an example, historical key use data and real time signals data may be aggregated and stored per category and per key in storage 438. Storage 438 may comprise, for example, a data lake. In an example, a prefetch processing pipeline (e.g., based on historical key access data and driver signals) may have multiple layers of partitioning (e.g., for scaling). For example, a (e.g., each) key category may have an (e.g., a dedicated) event hub entity. A namespace for event hub 434 may have multiple (e.g., ten) entities, which may map to multiple (e.g., ten) categories (e.g., in support scaling and category isolation). An event hub entity may have multiple (e.g., 20) partitions. A partition may correspond to a customer/tenant that may process events. A number of partitions may be selected, for example, based on a data volume for a category. A (e.g., each) category may have its own service bus queue (e.g., for messages).

An operation to read a key from cache may be tracked as an observation (e.g., regardless whether it is a cache hit or miss). An observation may represent (e.g., store) a time that a given key was accessed (e.g., regardless whether it was a cache hit or miss). Observations may (e.g., for scaling purposes) be sampled in (e.g., small) time intervals (e.g., defined by configuration) before they are uploaded to Event Hub 434. Observations may be sampled, for example, by Pre-Aggregation 432. Such observations may provide a source of historical key use information.

Data transformer 440 may be applied to time series data stored in storage 438. Historical use data and real-time (e.g., driver) signals may be transformed, for example, into a format accepted by a prediction model. In an example, time series historical use data and real-time (e.g., driver) signals stored in storage 438 as a time series dataset may be transformed and stored in storage 442 as a temporal classification dataset. In an (e.g., another) example, time series historical use data and real-time (e.g., driver) signals stored in storage 438 may be used to determine additional or alternative features in a format expected by a forecast model. Data transformer 440 may be configured and reconfigured (e.g., as needed) to transform time series data. In an example, data transformer 440 may be reconfigured for different forecast analyzers (e.g., models) that may expect different input data and/or utilize different data stored in storage 438. Data transformer 440 may be configured and scaled by Data Transformer (DT) Background Process 426 (e.g., using one or more configurations stored in configuration DB 414). DT Background Process 426 may (e.g., also) be configured with one or more configurations stored in configuration database (DB) 414. In an example, DT Background Process 426 may be implemented as a Databricks job, for example, to process data transformer workload as a background process. Databricks may support background jobs at scale, with cluster configurations set to run CPU intensive tasks in parallel with multiple servers and virtual machines (VMs).

Feature extractor 441 may extract one or more features from data in the temporal classification dataset in storage 442. For example, feature extractor 441 may extract time series seasonality features, trend features, temporal representation features, and/or statistics features from the temporal classification dataset. Extracted features may be added to other features extracted from the temporal classification dataset. Extracted features may be stored as a temporal classification featurized dataset in storage 443.

Forecast analyzer 444 (e.g., one or more temporal classification models) may process temporal classification featurized dataset stored in storage 443. Forecast analyzer 444 may generate forecast classification labels, which may indicate, for example, which keys should be prefetched and stored in cache 452 for one or more time intervals. Classification labels may be accompanied by confidence levels in the classifications. The classification labels (e.g., and confidence levels) resulting from forecasting may be stored (e.g., as forecasts) in storage 446. Forecast analyzer 444 may be scaled by Forecast Analyzer (FA) Background Process 428, which may be configured in accordance with configuration DB 416. In an example, FA Background Process 428 may be implemented as a Databricks job.

One or more temporal classification models in forecast analyzer 444 may be configured and reconfigured, trained and retrained (e.g., ad hoc as needed and/or on schedule) to generate classification labels for categories of keys or individual keys for one or more future time intervals. In an example, different models trained on (e.g., and receiving as input) different features may be applied to forecast for different categories, keys and/or time intervals or other variables. Selectable models and configurations may be stored in configuration DB 418. FA Background Process 428 may configure forecast analyzer 444 as needed based on configurations retrieved from configuration DB 418.

Forecast analyzer 444 may be configured, for example, with a specific horizon. In various configurations, a horizon may comprise, for example, a number of time intervals, a number of minutes, hours or days. A horizon may be determined, for example, based on forecast accuracy. In an example, a "just in time" horizon (e.g., a number of minutes or time intervals) may be more accurate than a 24-hour horizon. A forecast model may be selected, for example, based on analyses performed by feature extractor, which may determine patterns in data. Prefetch forecast models may be trained, for example, with an exponential smoothing model or an autoregressive integrated moving average (ARIMA) model.

Real-time signals may be evaluated (e.g., as features) by forecast analyzer 444 or may be processed by a determiner (e.g., data prefetcher 448) with forecasts by forecast analyzer 444. For example, real-time Forecast Analyzer (RFA) Background Process 412 may process aggregated data streamed from event hub 434 and transformed data stored in storage 442. RFA Background Process 412 may operate in parallel with forecast analyzer 444 and FA Background Process 428. Output from RFA Background Process 412 may be stored in storage 446 (e.g., along with forecasts generated by forecast analyzer 444). While FA Background Process 428 may run intermittently on a schedule, RFA Background Process 412 may run continuously to process incoming data and signals in (e.g., nearly) real-time. While the output may be similar in both background processes, the input streams may be different. RFA Background Process 412 may be lightweight, for example, using a short lookback window with a small dataset and more emphasis on real-time signals. RFA Background Process 412 may optimize for short-lived predictions, for example, to determine what keys need to be cached up to the next few (e.g., 10) minutes. RFA Background Process 412 may detect and react to sudden changes in usage trends or patterns. FA Background Process 428 may be more resource intensive, for example, by using a longer lookback window with a larger dataset. FA Background Process 428 may optimize for long-living predictions, for example, to determine keys to cache up to the next few (e.g., 8) hours.

Data prefetcher 448 may perform prefetching operations. Prefetching operations may be performed in the background (BG). Data prefetcher 448 may access forecasts (e.g., and other information from one or more sources) stored in storage 446 to determine which keys to prefetch, when to prefetch them and how long their TTLs should be. Data prefetcher 448 may be configured by configuration loader 430, which may access configurations in configuration DB 418. Data prefetcher 448 may prefetch requested keys and store them in cache 452. In an example (e.g., with reference to FIG. 1), cache 452 may represent L1 cache 125. Data access endpoint 120 may (e.g., first) search L1 cache 125 for a key to construct a response to a request received from application 110.

In an example, prefetching operations may occur on one or more servers (e.g., one or more API gateway service (AGS) servers). In an example, prefetching operations may be distributed among multiple servers and performed as background operations. One or more configurations in configuration DB 418 may configure data prefetcher 448 to perform prefetch operations on one or more servers. Data prefetcher 448 may comprise a prefetch scheduler to schedule prefetching prior to a predicted request window. A prefetch scheduler may retrieve forecasting results from storage 446. Prefetch scheduling may occur in a background process. In an example, a prefetch scheduler may schedule prefetch operations, for example, by specifying a list of keys to prefetch, an indication when to prefetch and a TTL for a cached key. Prefetch scheduling times may be distributed or spread over a time window, for example, to avoid spikes in prefetch operations.

FIG. 5 is a block diagram of an example prefetching architecture with temporal classification based on a time series dataset and driver signals, according to an example embodiment. Prefetching (e.g., for L1 cache 125) may be implemented, for example, in multiple stages, such as, for example, data aggregation, data transformation, forecast analysis, prefetch scheduling and prefetching.

Example architecture 500 may be implemented, for example, by datacenter 505 comprising one or more data center servers, e.g., as shown by example in FIG. 1. As indicated in example architecture 500, various prefetch operations may be distributed among one or more servers. A (e.g., each) server may be sliced into multiple VPSs, each slice comprising a portion of available resources, for example, to process one or more workloads and/or to serve one or more customers/tenants (e.g., based on one or more SLAs). A slice may comprise multiple API gateway service (AGS) frontends (FEs), e.g., 520, 522, 524, on one or more data servers.

In an example, data aggregation may be implemented, for example, by multiple AGS FEs, e.g., 520, 522, 524. In an example, each AGS FE 520, 522, 524 may aggregate a count of cache reads per category and per key. For example (e.g., in AGS FE 524), pre-aggregation 532 may aggregate historical key use data from cache 552. Pre-aggregation 532 may be configured by config 550, for example, regarding what historical data to collect for particular categories or keys. In an example, pre-aggregation 532 may be configured and reconfigured to collect data for different categories, keys and/or models (e.g., forecast analyzers). Aggregated historical data may be provided (e.g., streamed) to event hub 534. Driver signals 510 may (e.g., also) be provided (e.g., streamed) to event hub 534. Event hub 534 may comprise a streaming platform and event ingestion service. Event hub 534 may, for example, receive and process millions of events per second.

Historical use data and driver signal data sent to event hub 534 may be streamed to event hub capture 536 for storage (e.g., as a time series) in storage 538. In an example, historical key use data and real time signals data may be aggregated and stored per category and per key in storage 538. Storage 538 may comprise, for example, a data lake. In an example, a prefetch processing pipeline (e.g., based on historical key access data and driver signals) may have multiple layers of partitioning (e.g., for scaling). For example, a (e.g., each) key category may have an (e.g., a dedicated) event hub entity. A namespace for event hub 534 may have multiple (e.g., ten) entities, which may map to multiple (e.g., ten) categories (e.g., in support scaling and category isolation). An event hub entity may have multiple (e.g., 20) partitions. A partition may correspond to a customer/tenant that may process events. A number of partitions may be selected, for example, based on a data volume for a category. A (e.g., each) category may have its own service bus queue (e.g., for messages).

An operation to read a key from cache may be tracked as an observation (e.g., regardless whether it is a cache hit or miss). An observation may represent (e.g., store) a time that a given key was accessed (e.g., regardless whether it was a cache hit or miss). Observations may (e.g., for scaling purposes) be sampled in (e.g., small) time intervals (e.g., defined by configuration) before they are uploaded to Event Hub 434. Observations may be sampled, for example, by Pre-Aggregation 432. Such observations may provide a source of historical key use information.

Data transformer 540 may be applied to time series data stored in storage 538. Historical use data and real-time (e.g., driver) signals may be transformed, for example, into a format accepted by a prediction model. In an example, time series historical use data and real-time (e.g., driver) signals stored in storage 538 may be transformed and stored in storage 542 as a temporal classification dataset. In an (e.g., another) example, time series historical use data and real-time (e.g., driver) signals stored in storage 538 may be used to determine additional or alternative features in a format expected by a forecast model. Data transformer 540 may be configured and reconfigured (e.g., as needed) to transform time series data. In an example, data transformer 540 may be reconfigured for different forecast analyzers (e.g., models) that may expect different input data and/or utilize different data stored in storage 538. Data transformer 540 may be configured and scaled by Data Transformer (DT) Background Process 526 (e.g., using one or more configurations stored in configuration DB 514). DT Background Process 526 may (e.g., also) be configured with one or more configurations stored in configuration DB 514. In an example, DT Background Process 526 may be implemented as a Databricks job. Databricks may support background jobs at scale, with cluster configurations set to run CPU intensive tasks in parallel with multiple servers and virtual machines (VMs).

Feature extractor 541 may extract one or more features from data in the temporal classification dataset in storage 542. For example, feature extractor 541 may extract time series seasonality features, trend features, temporal representation features, and/or statistics features from the temporal classification dataset. Extracted features may be added to other features extracted from the temporal classification dataset. Extracted features may be stored as a temporal classification featurized dataset in storage 543.

Forecast analyzer 544 (e.g., one or more temporal classification models) may process temporal classification featurized dataset stored in storage 543. Forecast analyzer 544 may generate forecast classification labels, which may indicate, for example, which keys should be prefetched and stored in cache 552 for one or more time intervals. Classification labels may be accompanied by confidence levels in the classifications. The classification labels (e.g., and confidence levels) resulting from forecasting may be stored (e.g., as forecasts) in storage 546. Forecast analyzer 544 may be scaled by Forecast Analyzer (FA) Background Process 528, which may be configured in accordance with configuration DB 516. In an example, FA Background Process 528 may be implemented as a Databricks job.

Forecast analysis may comprise multiple forecasting pipelines. For example, there may be a pipeline for streaming data from an event hub to a Databricks job that may be optimized for just in time predictions. There may be a pipeline for a full spectrum of data transformed and stored in storage (e.g., a data lake). A background job may be scheduled to run on a periodic basis to perform a forecasting analysis. The forecasting analysis may (e.g., for each category registered for prefetching) execute the analysis for an upcoming time window (e.g., horizon) and write forecast results in forecast storage 546. The horizon and other parameters used by a forecast model may be defined per category and may be provided by config DB 516.

One or more temporal classification models in forecast analyzer 544 may be configured and reconfigured, trained and retrained (e.g., ad hoc as needed and/or on schedule) to generate classification labels for categories of keys or individual keys for one or more future time intervals. In an example, different models trained on (e.g., and receiving as input) different features may be applied to forecast for different categories, keys and/or time intervals or other variables. Selectable models and configurations may be stored in configuration DB 516. FA Background Process 528 may configure forecast analyzer 544 as needed based on configurations retrieved from configuration DB 516.

Forecast analyzer 544 may be configured, for example, with a specific horizon. In various configurations, a horizon may comprise, for example, a number of time intervals, a number of minutes, hours or days. A horizon may be determined, for example, based on forecast accuracy. In an example, a "just in time" horizon (e.g., a number of minutes or time intervals) may be more accurate than a 24-hour horizon. A forecast model may be selected, for example, based on analyses performed by feature extractor, which may determine patterns in data. Prefetch forecast models may be trained, for example, with an exponential smoothing model or an autoregressive integrated moving average (ARIMA) model.

Real-time signals may be evaluated (e.g., as features) by forecast analyzer 544 or may be processed by a determiner (e.g., data prefetcher 548) with forecasts by forecast analyzer 544. For example, real-time Forecast Analyzer (RFA) Background Process 512 may process aggregated data streamed from event hub 534 and transformed data stored in storage 542. RFA Background Process 512 may operate in parallel with forecast analyzer 544 and FA Background Process 528. Output from RFA Background Process 512 may be stored in storage 546 (e.g., along with forecasts generated by forecast analyzer 544). While FA Background Process 528 may run intermittently on a schedule, RFA Background Process 512 may run continuously to process incoming data and signals in (e.g., nearly) real-time. While the output may be similar in both background processes, the input streams may be different. RFA Background Process 512 may be lightweight, for example, using a short lookback window with a small dataset and more emphasis on real-time signals. RFA Background Process 512 may optimize for short-lived predictions, for example, to determine what keys need to be cached up to the next few (e.g., 10) minutes. RFA Background Process 512 may detect and react to sudden changes in usage trends or patterns. FA Background Process 528 may be more resource intensive, for example, by using a longer lookback window with a larger dataset. FA Background Process 528 may optimize for long-living predictions, for example, to determine keys to cache up to the next few (e.g., 8) hours.

Prefetch scheduler 558 may schedule prefetching prior to a predicted request window. Scheduler 558 may retrieve forecasts from storage 546. Scheduler 558 may perform scheduling operations in a background process. Scheduler 558 may be configured by Scheduler Background Process 556, which may access configurations in configuration DB 554. In an example, scheduler 558 may schedule differently, for example, for different categories. In an example, scheduler 558 may schedule messages on service bus queue 560. A (e.g., each) message posted to service bus queue 560 may comprise, for example, a list of keys to prefetch, an enqueued timestamp (e.g., indicating when the message becomes visible) and a TTL (e.g., indicating a time interval the message is valid for before it is removed from the queue). Message scheduling times may be distributed or spread over a time window, for example, to avoid spikes in prefetch operations. Scheduler 558 may be scaled by Scheduler Background Process 556, which may be configured in accordance with configuration DB 554. In an example, Scheduler Background Process 556 may be implemented as a Databricks job.

Prefetching operations may be spread across multiple AGS FEs, e.g., 520, 522, 524. Prefetching operations may be performed in the background (BG). Messages from service bus queue 560 may be processed as they become visible, for example, on a first come, first serve basis. Prefetch scheduling times may be distributed or spread over a time window, for example, to avoid spikes in prefetch operations. For example, prefetcher 562 may prefetch requested keys and store them in cache 552. In an example (e.g., with reference to FIG. 1), cache 552 may represent L1 cache 125. Data access endpoint 125 may (e.g., first) search L1 cache 125 for a key to construct a response to a request received from application 110.

Figure 6:
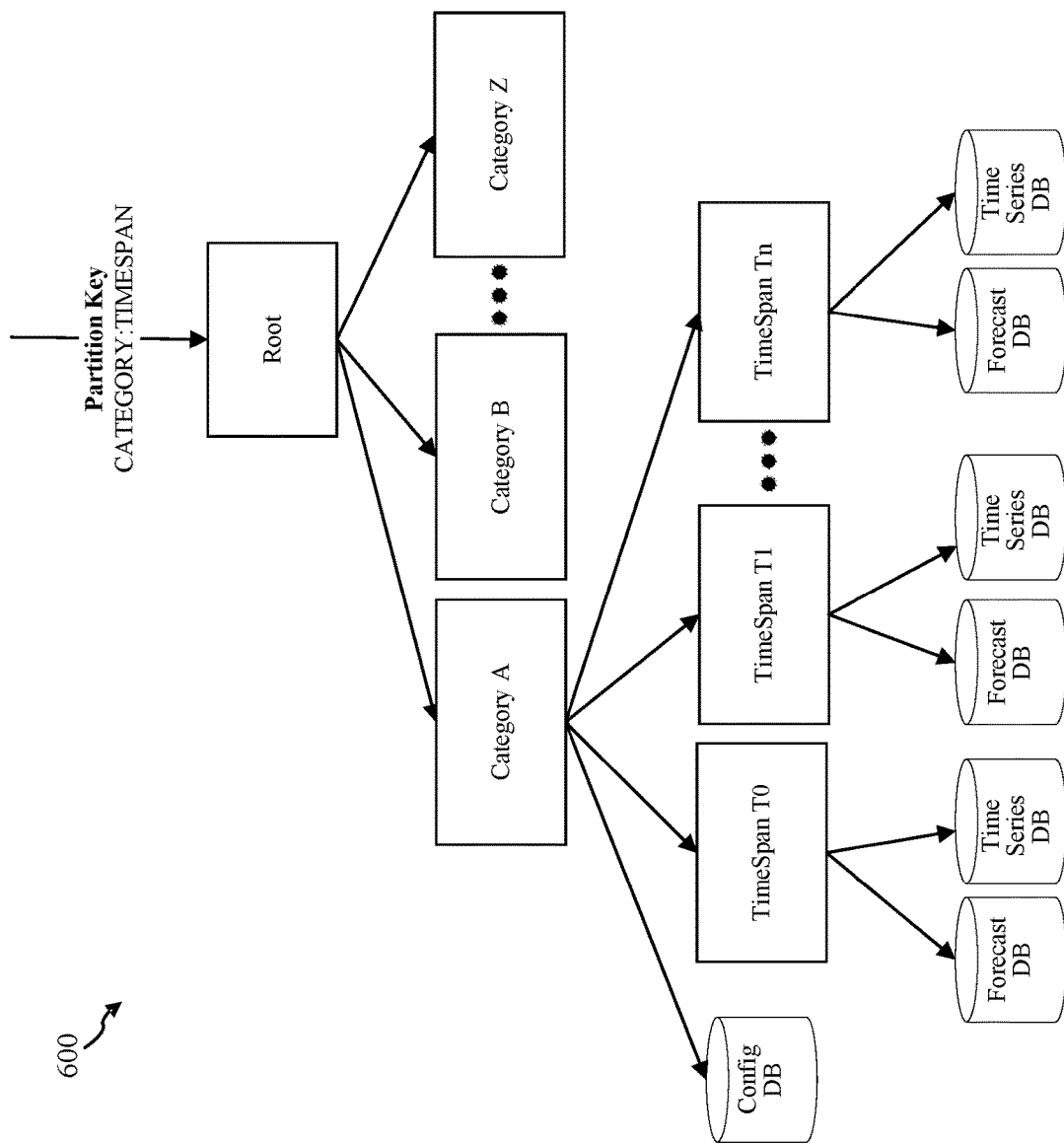
FIG. 6 is a block diagram of an example of indexing data by category and time intervals, according to an example embodiment.

FIG. 6 is a block diagram of an example of indexing data by category and time intervals, according to an example embodiment. A pipeline, including storage, may be partitioned, for example, in support of scaling. Each category may have its own service bus queue. Each queue (e.g., and messages in a queue) may have (e.g., configurable) size constraints. Storage (e.g., data lakes) may index data, for example, by category. Indexing example 600 shows one of many possible indexing arrangements. In an example (e.g., as shown in FIG. 6), indexing may leverage a file system hierarchy (e.g., directory folders). For example, information pertaining to a category (e.g., historical key use data, real time or driver signal data, configurations, forecasts and so on) may be aggregated and stored (e.g., in folders) per category (e.g., category A, category B, . . . category Z) under a root folder. Keys may be placed in categories may be selected, for example, based on commonalities (e.g., keys with common access patterns and so on). A category may comprise one or more keys. A (e.g., each) category may be partitioned by a configuration and timespans (e.g., TimeSpan T0, TimeSpan T1, . . . Timespan Tn). A (e.g., each) timespan may be partitioned by a forecast database and a time series database. A time series database may store, for example, historical key usage data and real time or driver signals for a respective timespan.

Implementations are not limited to the examples shown. Any number of computing devices and/or servers (including but not limited to machines and/or virtual machines) may be coupled in any manner via any type of computing environment. For example, one or more of computing device, server or storage components may be co-located, located remote from each other, combined or integrated on or distributed across one or more real or virtual machines. Examples shown and discussed with respect to FIGS. 1-6 may operate, for example, according to example methods presented in FIGS. 7A-C and FIG. 8.

FIGS. 7A-C show an example data and process flow diagram for prefetching with temporal classification based on a time series dataset and driver signals, according to an example embodiment. FIGS. 7A-C present one of many data and process flows for data aggregation, prefetch forecasting and prefetch scheduling. No order of steps is required unless expressly indicated or inherently required. There is no requirement that a data and process flow implement all of the steps illustrated in FIGS. 7A-C. FIGS. 7A-C are simply one of many possible embodiments. Embodiments may implement fewer, more or alternative data and process flow components.

An example data and process flow diagram 700A, 700B and 700C may comprise, for example, data aggregation 702, forecasting 716, forecast analyzer 734, scheduling 756 and scheduling per key 772. The example shown in FIGS. 7A-C does not address prefetching or request/query response.

Information involved in a prefetch prediction data and process flow may comprise, for example, historical usage data 714, real-time or driver signals 738, category 704, lookback 706, interval 708, indexed time offset 710, horizon 720, trained models 740, forecast runtime 742, confidence threshold 748, and schedule time offset 776.

Historical usage data may comprise timestamped data indicating when a key was used to respond to a request.

Real-time or driver signals may comprise any signal other than historical use data that may influence the likelihood of a key and/or category of keys being needed to respond to one or more future requests.

A key may comprise (e.g., hashed) data (e.g., metadata) that may be used to respond to one or more requests.

A category may comprise a cache category for which prediction and prefetching may be applied. A category may comprise information (e.g., representations, usage, forecasts) for one or more keys that may be grouped in the category (e.g., based on one or more similarities, such as the same or similar access patterns).

A lookback may comprise a time window in the past, e.g., to determine historical key use patterns that may be used to train a model to predict the future in a forecast process. A lookback may be timeless, bound to computational limits to process the data.

An interval may be used to aggregate and index data in time intervals (e.g., aggregate and index historical key use data in 5-minute samples), for example, to reduce computation cycles, consumption of memory and storage resources.

An Indexed Time Offset may comprise a configuration used to aggregate and index data on different time intervals for a category, for example, to support uniform distribution of prefetch operations across different categories. In an example (e.g., where category A and B use the same aggregation interval), category B may use a different offset such that prefetch operations are scheduled in different time window than prefetch operations for category A.

A horizon may comprise a time window in the future where one or more predictions may be made about what keys may be used.

A forecast model may be used to forecast keys that may be needed for future requests in one or more time intervals of a forecast horizon. A forecast model may be optimized for use with one or more keys and/or categories that may have the same or similar use patterns and seasonalities.

Machine learning and forecast models may be trainable, where a training step may precede the forecast step. A forecast function may use the output of a training step as input. A forecast function may be optimized to be a (e.g., very) lightweight process. A training step may be very resource intensive and slow, but training may not need to run very frequently. The accuracy of a forecast model may be improved with more frequent retraining. Training and retraining may involve analyzing a large dataset (e.g., all historical usage and signals for previous year) to detect what patterns, trends and seasonality the data exposes. These parameters discovered during training and retraining may be provided as input to a forecast evaluation function. Some forecast functions may work without a trained model.

A confidence threshold may comprise a (e.g., normalized) threshold (e.g., between 0 and 1) that represents a minimum confidence required for a key to be selected for prefetch. A change in threshold configuration may be reflected in precision and recall metrics and (e.g., therefore) output (e.g., keys to prefetch). In an example of a forecast model, when a confidence threshold increases, precision may increase and recall may decrease (e.g., due to decreased cache hit ratio). A decrease in a confidence threshold may result in increased recall (e.g., increased cache hit ratio) and decreased precision.

A Schedule Time Offset may comprise a maximum timespan used to compute a scheduling start time of prefetch operations for a category, for example, to enable uniform distribution of prefetch operations within a timespan. In an example where a key may be expected to be needed between 9:00 and 10:00 and where an offset is −10 minutes, a key may be scheduled with a start time between 8:50 to 9:00. Multiple keys with the same schedule may be distributed evenly over a time window.

FIG. 7A shows an example of data aggregation. Data aggregation 702 may comprise aggregation process 712, which may be distributed, for example, among multiple servers. Inputs to aggregation process 712 may comprise, for example, category 702, lookback 706, interval 708 and indexed time offset 710. Aggregation process 712 (e.g., implemented on multiple servers) may search for and aggregate information about keys accessed to create responses to requests/queries. Category 704 may indicate to aggregation process 712 what categories of keys to search for. Lookback 706 may indicate to aggregation process 712 how far back to look. For example, aggregation process 712 may ignore key use data with a timestamp earlier than indicated by lookback 706. Interval 708 may indicate to aggregation process 712 time intervals to aggregate historical use information. Indexed time offset 710 may indicate to aggregation process 712 a shift in the aggregation interval for a category. Aggregation process 712 may store aggregated data as historical usage data 714, for example, in accordance with the example shown in FIG. 6.

FIG. 7B shows an example of prefetch forecasting. Forecasting 716 may comprise forecast process 718, which may be distributed for example, among multiple servers. Inputs to forecast process 718 may comprise, for example, category 704, lookback 706, interval 708, indexed time offset 710, horizon 720, historical usage data 714, trained models 740, forecast runtime 742 and confidence threshold 748. Forecast process 718 may make forecasts for each category and/or key with a time-series dataset showing a history of use. Forecast process 718 may use models trained on usage data in lookback window 706. Forecast process 718 may make forecasts (e.g., generate classification labels with or without confidence levels) based on features extracted for each category or key per time interval 708. Forecast process 718 may generate forecasts for each interval 722 in horizon 720 for each key 732 in the population of keys accessed in the lookback window 730.

Forecast analyzer 734 may transform 744 time-series data 714 and real-time signals 738 into a temporal classification dataset, extract 744 features for a temporal classification featurized dataset, forecast 746 classification labels with confidence indicators based on the featurized dataset and determine 750 (e.g., based on confidence levels and thresholds 748) whether to keep 754 or discard 752 keys as prefetching candidates provided to decision process 724.

Forecast runtime 742 may select a trained model 740. The selected temporal classification model may forecast classification labels with confidence indicators 746 based on a temporal classification featurized dataset. Forecast runtime may comprise a background process, which may use historical and/or real-time data and/or features based thereon to train, select and optimize trained models 740 and a forecasting process. For example, the background process may map temporal classification models to categories and/or keys and/or to features in rows of a temporal classification featurized dataset. The background process may compute metrics (e.g., precision, recall) for each model, for example, by comparing historical usage data with forecast key usage.

A confidence indicator may be generated for each forecast 746. A decision 750 may be made whether the confidence indicator for the forecast 746 is above a confidence threshold 748. The forecast key may be discarded 752 from a determination when the confidence indicator for the forecast 746 is below confidence threshold 748. The forecast key may be selected 754 (e.g., for a determination 724 whether to prefetch based on the forecast classification label 746) when the confidence indicator for the forecast 746 is above confidence threshold 748. The confidence threshold comparison decision process (e.g., to discard or select for analysis of the classification label) may occur for each forecast key for one or more intervals. Decision process per key 724 may determine whether to prefetch each key for each interval based on classification labels predicted with a sufficiently high confidence level. A list of keys to prefetch 726 may be accumulated and stored as forecasts 728.

FIG. 7C shows an example of prefetch scheduling (e.g., for forecast classification labels indicating prefetch associated with a confidence level above a threshold confidence level). Scheduling 756 may comprise schedule process 758, which may be distributed, for example, among multiple servers. Inputs to scheduling process 756 may comprise, for example, category 704, lookback 706, interval 708, indexed time offset 710, horizon 720, forecasts 728 and scheduled time offset 776. Scheduling process 758 may schedule per key 772 for each interval 762 in horizon 720 for each key 770 in the list of keys to prefetch 768. Schedule parameters may be computed 778 (e.g., based on any schedule time offset 776) for key forecasts 728. Schedule parameters may include, for example, start time 780 and time to live (TTL) 782. Scheduling per key 764 may be pushed to queue 766, which may be distributed, for example, among multiple servers.

A prefetching system may be improved, for example, based on metrics. Metrics may be applied to monitor prefetching system performance. Metrics may comprise, for example, cache miss ratio, request latency, coverage, accuracy and timeliness. Coverage may comprise the fraction of total misses eliminated by prefetching. Accuracy may be the fraction of total prefetches that were useful (e.g., ratio of number of keys prefetched and actually requested compared to total prefetches. Timeliness may be a difference in time between key prefetch and use.

FIG. 8 shows a flowchart of a method for prefetching with temporal classification based on a time series dataset and driver signals, according to an example embodiment. Embodiments disclosed herein and other embodiments may operate in accordance with example method 800. Method 800 comprises steps 802-820. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 8. FIG. 8 is simply one of many possible embodiments. Embodiments may implement fewer, more or different steps.

In step 802, historical use data may be aggregated from distributed computing devices as time series data for each key. For example, as shown in FIGS. 3-6 and 7A-C, one or more servers (e.g., AGS FEs) may aggregate historical use data.

In step 804, historical use data may be indexed by cache categories and time intervals. For example, as shown in FIGS. 3-6 and 7A-C, historical use data may be indexed in storage by cache categories and cache categories may be indexed by timespan, with forecasts and historical time series data stored indexed to timespans.

In step 806, real-time signals (e.g., that indicate prevailing conditions) that may affect forecasts may be monitored. For example, as shown in FIGS. 3-5 and 7A-C, signals 314, 410, 510, 738 may be monitored.

In step 808, the historical time-series dataset may be transformed into a temporal classification dataset. For example, as shown in FIGS. 3-5 and 7A-C, historical use data may be transformed into a temporal classification dataset.

In step 810, features may be extracted from the temporal classification dataset and any real-time signals to generate a temporal classification featurized dataset. For example, as shown in FIGS. 3-5 and 7A-C, features may be extracted to generate a temporal classification featurized dataset.

In step 812, forecasts may be generated based on the temporal classification featurized dataset, where the labels indicate whether to prefetch keys for potential future requests during future time intervals. For example, as shown in FIGS. 3-5 and 7A-C, forecaster 333, forecast analyzer 444, 544, forecast runtime 742, trained models 740 may generate forecasts (e.g., forecast 746) to indicate whether to prefetch keys based on a temporal classification featurized dataset.

In step 814, a confidence indicator may be generated for each forecast. For example, as shown in FIG. 7B, a confidence indicator may be generated for forecast 746.

In step 816, each confidence indicator may be compared to a configurable confidence threshold. For example, as shown in FIG. 7B, confidence indicator 746 may be compared 750 to confidence threshold 748.

In step 818, a determination may be made whether to prefetch a key based on the forecast and the comparison. For example, as shown in FIG. 7B, a determination may be made whether to select a key 754 or discard a key 752 for a decision whether to prefetch based the comparison 750 and, for classification labels with sufficiently high confidence levels, a decision 724 is made whether to prefetch a key for a future time interval based on a predicted classification label.

In step 820, prefetch operations may be scheduled (e.g., for distributed execution). For example, as shown in FIGS. 3, 5 and 7A-C, prefetch scheduler 344, scheduler 558, scheduling 756 and scheduling per key 772 may schedule prefetch operations.

In step 822, a time to live (TTL) may be assigned to each key independent of TTLs for other keys. For example, as shown in FIGS. 3, 5 and 7A-C, prefetch scheduler 344, scheduler 558, scheduling 756 and scheduling per key 772 may assign a TTL to each key independent of assigning TTLs to other keys.

In step 824, prefetch operations may be distributed to a plurality of computing devices. For example, as shown in FIGS. 3, 5 and 7C, servers (e.g., data center server 160 and 165) may perform prefetch operations based on messages in service bus queue 346, 560 or 766.

FIGS. 9-12 (e.g., in contrast to FIGS. 1-8) show a more general example applicable to many different types of forecasting, such as using a temporal classification model to predict classification labels used to determine whether to take one or more actions, such as, for example, (pre)allocating a computing resource, prefetching information or a search index, dispatching a transportation service to a geographic area, ordering goods to restock inventory, charging a battery, etc. These are only a few examples of the utility of a temporal classification model.

FIGS. 9A and 9B show an example of generating a temporal classification featurized dataset, according to an example embodiment. Example data preparation system 900 comprises inputs 902, temporal classification transformer 916 and feature generator 922. FIGS. 9A and 9B show one of many example implementations of a data preparation system.

Inputs 902 may comprise, for example, origin 904, lookback 906, horizon 908, interval 910, time series dataset 912 and real-time data 914. Other implementations may have the same or different (e.g., more or fewer) inputs.

Origin 904 may comprise the origin of forecasting, which is the dividing line between historical (features) and future (forecasting/prediction) for any activity with a model (e.g., training, testing, validating or using a trained, tested or validated model for real-time predicting). The origin (e.g., of forecasting) that divides historical from predictive may change within the same set of data (e.g., when doing training, testing and validating). An origin may be set to the past, for example, to test use forecast by a model against actual use.

Lookback 906 may comprise an interval of time to look back, starting from the origin. The time between the origin and lookback may comprise a lookback time window.

Horizon 908 may comprise an interval of time to look forward, starting from the origin. The time between the origin and horizon may comprise a horizon time window.

Interval 910 may comprise intervals of time in a lookback window or a horizon window. Intervals in a horizon may or may not be the same as intervals in a lookback. Values for a monitored activity (e.g., usage of information, (pre)allocation or use of a resource, sale of a good or service, etc.) may be aggregated in each time interval. Intervals and values therein may be reflected in a time series classification dataset.

Time Series dataset 912 may comprise a raw dataset that represents time ordered measures of a quantity (e.g., usage of information or a resource) during successive time intervals (e.g., equally spaced periods of time) over a time window.

In an example (e.g., as shown in FIG. 9B), there may be a time series set of data for each variant (e.g., each data key that may be used to retrieve requested information, each resource that may be (pre)allocated or used, each good or service that may be sold, etc.). Time series datasets for each variant may measure, for example, an activity involving variants during intervals (e.g., at equally spaced periods of time). In an example, a time series dataset may start at time T (origin lookback time) and may end at time T+N, where N may be a number of intervals (e.g., equally spaced time periods). N may be, for example, minutes, hours, days, etc.

A simplified example of time-series dataset 912 is shown in FIG. 9B. Example time-series dataset 912 shows (in each row) a time-series dataset for each key/variant. Each data key is associated with values indicating usage for each time interval identified in the column header. In an example, example time-series dataset 912 may consist of 842 hours of historical usage (e.g. N=842) in one hour (3600 second) intervals.

Real-time data 914 may comprise drivers (e.g., prevailing conditions) that may influence future requests. Real-time data 914 may or may not be utilized, depending on the implementation.

Temporal classification transformer 916 may comprise transformer 918.

Temporal classification transformer 916 may preprocess time series dataset 912 (e.g., in preparation for classification tasks) based on origin 904, lookback 906, horizon 908 and interval 910. A transformation process may maintain the temporal nature of time-series dataset 912. Transformer 918 may generate temporal classification dataset 920 (e.g., for use in feature extraction).

In an example (e.g., as shown in FIG. 9B), each time series classification dataset for each variant (e.g., key) may comprise K datasets with K time intervals each with values (e.g., for tracked occurrences) and a K+1 label. K is less than N. For training and evaluation datasets, the K+1 label value in historical data will be known, which allows for training and evaluation of a temporal classification model. The largest value of K may result in K+1=N. As a result, all possible time windows of size K for each variant may be provided to a temporal classification model with a label at K+1. The window of size K may be shifted by one for each time window to be provided to a temporal classification model.

A simplified example of temporal classification dataset 920 is shown in FIG. 9B. Example temporal classification dataset 920 shows (in each row) a temporal classification dataset for each key/variant. Intervals in the lookback window are shown consecutively numbered as t13-t99 based on a lookback window K set to 99 hours, ignoring the most recent 12 hours of data. The (e.g. binary) classification label at each K+1 time interval is known for model training and evaluation datasets.

Feature generator 922 may perform featuring engineering by generating additional and/or alternative features (e.g., based on available information), for example, to improve model classification performance. Feature generator 922 may extract features, for example, from temporal classification dataset 920.

Feature generator 922 may comprise, for example, feature extractor 924 and feature normalizer 932. Feature generator components may vary by implementation, for example, based on features determined to provide desired performance metrics, based on the ability to generalize for different time-series datasets, and/or other desired characteristics.

Feature extractor 924 may pass through or modify features present in temporal classification dataset 920, such as intervals and values therein. Feature extractor 924 may generate additional and/or alternative features. Features to be generated by feature extractor 924 may be selected, for example, automatically or manually, based on design, implementation, and/or performance criteria. A prospective temporal classification model may go through a learning process to determine whether selected features are helpful and to determine weights that may be associated with features. In an example, feature extractor 924 may generate data seasonality features 926, temporal representation features 928, statistical features 930.

Data seasonality features 926 may comprise data seasonality and/or trend features. In an example, a trend feature may comprise, for example, an increasing or decreasing sequence over a sequence of intervals in a time window. An example of seasonality may comprise, for example, repetitive maximums or repetitive minimums, such as repetition over M days, weeks or months at the same timestamp each day, week or month.

In an example (e.g., as shown in FIG. 9B), data seasonality features for each variant (e.g., key) may comprise, for example, an average value for all days, an average value for the last three days of data, an average value for a current day, and so on.

Temporal representative features 928 may comprise, for example, contextual identification of available data, such as work weeks, work days, work hours, public holidays, etc., which may vary by country or region.

In an example (e.g., as shown in FIG. 9B), temporal representative features for each variant (e.g., key) may comprise, for example, identification of what data represents, such as what hour of a day, what week in a year, what day of a week, what day of a year, and so on. In an example with N=672 time intervals spanning four weeks, a lookback window may comprise K=168 time intervals (e.g., to be used to train and evaluate a model or to be used by a trained model to forecast). Each variant (e.g., key) may have N-K rows of features (e.g. as input to a model for training and evaluation or for forecasting).

Statistical features may comprise statistically calculated values based on available data values. Statistical features 930 may comprise, for example, mean, variance, standard deviation, peaks auto correlation, etc. based on values for time intervals in a lookback window.

In an example (e.g., as shown in FIG. 9B), statistical features for each variant (e.g., key) may comprise, for example, the average number of values in time intervals that are zero, the average number of values in time intervals that are non-zero, the maximum value, the minimum value, variance between values, standard deviation of values, a median value, peaks, autocorrelation, and so on.

Feature normalizer 932 may (e.g., as shown by example in FIG. 9B) normalize one or more feature values, for example, between 0 and 1, between −1 and 1, etc. A model may be trained on a similar range of values for features that it will receive during requests for predictions.

Feature generator 922 may generate temporal classification featurized dataset 934. A simplified example of temporal classification featurized dataset 934 is shown in FIG. 9B. In an example, temporal classification featurized dataset 934 may comprise a combination of features in temporal classification dataset 920, seasonality and trend features 926, temporal representation features 928 and statistical features 930. Temporal classification featurized dataset 934 may comprise, for example, t13, t14, t15, . . . t97, t98, t99, avgOfAllDays, last3DaysAvg, currentDayAvg, hour_of_day, week,day_of_week, . . . , day_of_year, zeros, nonZeros, max, min, var, std, median, . . . , peaks, autoCorr, Label. A key field may not be included in a feature set, for example, so that a model is not key-specific and may predict classification labels for keys it was not trained on.

FIG. 10 shows an example of training and evaluating a temporal classification model, according to an example embodiment. Example model generation system 1000 may use a temporal classification featurized dataset (with known labels) 1002 to train a temporal classification model. Example model generation system 1000 may receive as input temporal classification featurized dataset (with known labels) 1002 and evaluation thresholds 1018.

Temporal classification featurized dataset (with known labels) 1002 may be generated, for example, in accordance with example data preparation system 900 shown in FIG. 9A.

Evaluation thresholds 1018 may comprise thresholds for model evaluation, such as precision, recall and accuracy thresholds to compare to precision, recall and accuracy values determined for a particular model. Evaluation thresholds 1018 may be used to evaluate whether a trained model performs in accordance with standards or expectations.

Temporal classification featurized dataset (with known labels) 1002 may be split into training set 1006 and testing set 1012 by dataset splitter 1004. Dataset splitting may vary between implementations. In an example, a split may be temporal. For example, a temporal split of the classification samples into training and testing sets 1006, 1012 may result in training a temporal classification model with samples for older time intervals (e.g., before time T) and testing (e.g., evaluating or validating) the model with samples for more recent time intervals (e.g. after time T or from time T to time L). In an example, given four weeks of time-series data, the first three weeks may be to train a model and the last week of data may be used to evaluate the model. In an example, transformation of time series datasets for all variants (e.g., keys) into a temporal classification featurized dataset 1002 may produce tens of millions of samples for training and evaluation.

A training process may utilize training set 1006, trainer 1008 and temporal classification model 1010. Trainer 1008 may train temporal classification model 1010 with training set 1006. A trained model may be retrained, for example, as needed or periodically (e.g., based on more recent time-series datasets).

Multiple models with multiple (e.g., different) feature sets may be trained (and evaluated). Performance metrics may be compared to performance thresholds, for example, to select the best model for each dataset. In an example of training different models, a model may by trained with values for previous days at the same timestamp and weight decay. Various machine learning (ML) models may be trained, such as logistic regression, random forest, and boosting decision trees. Various neural network models may be trained and evaluated, such as Dense and LSTM.

A training process may utilize different settings to determine the best hyper parameters values. In an example of random forest training and evaluation, parameter values may be determined for the number of trees, the depth of each tree, the number of features, the minimum number of samples in a leaf node, etc. In an example of boosting decision trees, parameter values may be determined for the depth of the tree, minimum number of samples in leave node, number of leave nodes, etc. In an example of a neural network, parameter values may be determined to epoch, activation, number of neurons in each layer, and the number of layers.

An evaluation process may utilize testing set 1012, scorer 1014, score results 1016, evaluation thresholds 1018 and evaluator 1020. Scorer 1014 may apply testing set 1012 to trained temporal classification model 1010. Testing set 1012 may comprise "future" data (e.g., beyond the training horizon) to evaluate the model. Scorer 1014 may compare the actual classification label in testing set 1012 to the classification label predicted by trained temporal classification model 1010. Scorer 1014 may score the prediction performance of the trained temporal classification model 1010. Scorer 1014 may generate score results 1016.

Evaluator 1020 may receive, as input, testing set 1012, score results 1016 and evaluation thresholds 1018. Inputs may be used by evaluator 1020 to determine performance metrics of a trained temporal classification model and whether to keep or discard (e.g., retrain) trained temporal classification model 1010. Performance indicators may vary between implementations. In an example, performance indicators may comprise precision 1022, recall 1024 and accuracy 1026. Performance indicators, such as precision, recall and accuracy, may be measured at different confidence intervals.

Precision is the fraction of variants (e.g., keys) that are accurately predicted (e.g., prefetched keys that are used). In an example, 100% precision would mean that all keys prefetched were used. Recall is a fraction of variants (e.g., keys) used (e.g., or other tracked and predicted activity) that were predicted (e.g., prefetched). In an example, 100% recall would mean that all keys used were prefetched. Accuracy is the fraction of variants (e.g., keys) whose activity (e.g., usage and non-usage) the model correctly predicted.

In an example (e.g., as shown in FIG. 10), precision may be calculated in accordance with Eq. 1, recall may be calculated in accordance with Eq. 2, and accuracy may be calculated in accordance with Eq. 3:

$$\text{Precision} = TP/(TP+FP) \qquad \text{Eq. 1}$$

$$\text{Recall} = TP/(TP+FN) \qquad \text{Eq. 2}$$

$$\text{Accuracy} = (TP+TN)/(TP+TN+FP+FN) \qquad \text{Eq. 3}$$

A true positive (TP) indicates an accurate prediction of need (e.g., use) of a variant (e.g., a key). A false positive (FP) indicates an inaccurate prediction of need (e.g., use) of a variant (e.g., a key). A true negative (TN) indicates an accurate prediction of no need for (e.g., no use of) a variant (e.g., a key). A false negative (FN) indicates an inaccurate prediction of no need for (e.g., no use of) a variant (e.g., a key).

Evaluator 1020 may sum evaluation metrics (e.g., using Eq. 1-3) for all predictions based on all samples in test set 1012. Evaluation metrics may be compared to evaluation thresholds 1018. A determination 1028 may be made whether evaluation metrics (e.g., precision, recall and accuracy) are above minimum thresholds. A trained model may be kept 1032, for example, when evaluation metrics for trained temporal classification model 1010 are above minimum evaluation thresholds 1018. A kept model may be deployed in a forecasting process. A trained model may be discarded 1030, for example, when evaluation metrics for trained temporal classification model 1010 are not above minimum evaluation thresholds 1018. A discarded model may be retrained.

Performance metrics may be tracked for deployed models. Deployed models may be subject to (e.g., ad hoc and/or periodic) retraining, for example, automatically and/or triggered by one or more performance metrics falling below a one or more deployment thresholds.

FIG. 11 shows an example of using a trained temporal classification model to predict classification labels for a temporal classification featurized dataset and determine action(s) based on the labels, according to an example embodiment. Example temporal classification system 1100 may be used to forecast classification labels indicating a need (or lack thereof) for many (e.g., hundreds, thousands, millions) of variants for many types of forecasting systems. Temporal classification may be a far more cost effective approach (e.g., in terms of computing resources) compared to a forecasting model per variant.

Example temporal classification system 1100 may comprise forecaster 1106 and determiner 1112. Forecaster 1106 may comprise trained temporal classification model(s) 1108, which may be trained and evaluated, for example, by example training and evaluation system 1000 shown in FIG. 10. Trained temporal classification model(s) 1108 may be selected by selector 1104, for example, when there is more than one model to choose from. Models may be selected, for example, based on performance for a given set of features and/or other criteria. A selected, trained temporal classification model(s) 1108 may generate forecasts 1110, for example, for each variant and each future time interval in temporal classification featurized dataset 1102.

Determiner 1112 may determine 1114 one or more actions based on forecasts 1110. Temporal classification featurized dataset 1102 may be configured to provide features for any type of action that may be tracked and predicted (e.g., based on historical usage). Classification labels in forecasts 1110 may be used by determiner 1112, for example, to determine whether to allocate or preallocate (e.g., for one or more time intervals) a computing resource, prefetch information or a search index, dispatch a transportation service to a geographic area, order goods to restock inventory, charge a battery, etc. Computing resources may include, for example, cloud resources, network bandwidth, processors, memory, storage and so on. Information may comprise, for example, data or representation of data (e.g., key), executable code, and so on.

FIG. 12 shows a flowchart of a method for creating and using a model to predict classification labels based on temporal data, according to an example embodiment. Embodiments disclosed herein and other embodiments may operate in accordance with example method 1200. Method 1200 comprises steps 1202-1220. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 12. FIG. 12 is simply one of many possible embodiments. Embodiments may implement fewer, more or different steps.

In step 1202, one or more temporal classification models may be trained, for example, based on a training dataset created from a portion of a temporal classification dataset. For example, as shown in FIG. 10, temporal classification model 1110 may be trained by trainer 1008 based on training set 1006 created from temporal classification featurized dataset (with known labels) 1002.

In step 1204, the one or more trained temporal classification models may be evaluated, for example, based on a testing dataset created from a portion of the temporal classification dataset. For example, as shown in FIG. 10, trained temporal classification model 1110 may be evaluated by evaluator 1020 based on testing set 1012 created from temporal classification featurized dataset (with known labels) 1002.

In step 1206, a time series dataset may be received. The time series dataset may indicate whether an event occurred, or a number of occurrences of the event that occurred, during each of a plurality of past time intervals. For example, as shown in FIGS. 9A and 9B, time series dataset 912 may be received. As shown in FIG. 9B, time series dataset 912 may indicate, for each variant (e.g., key), the number of occurrences of an event (e.g., use of the key) during each of multiple past time intervals.

In step 1208, a subset of the past time intervals in the time series dataset may be selected for transformation into the temporal classification dataset based on a lookback window. For example, as shown in FIG. 9A, temporal classification transformer 916 may use inputs 902, such as origin 904, lookback 906 and interval 910 to select a subset (e.g., up to a full set) of time series dataset 912 to transform into temporal classification dataset 920.

In step 1210, the time series dataset may be transformed into a temporal classification dataset, e.g., for the selected lookback window. For example, as shown in FIGS. 9A and 9B, time series dataset 912 is transformed into temporal classification dataset 920 based on the selected lookback window.

In step 1212, a featurized dataset with at least one feature may be generated based on the temporal classification dataset. The at least one feature may comprise, for example, at least one of a seasonality feature, a trend feature, a temporal representation feature and a statistical feature. For example, as shown in FIGS. 9A and 9B, temporal classification dataset 920 may be converted into temporal classification featurized dataset 934 by feature extractor 924. Temporal classification featurized dataset 934 may include at least one of data seasonality features 926, temporal representation features 928 and/or statistical features 930.

In step 1214, a real-time feature may be generated (e.g., from real-time data).

A real-time feature may comprise an indicator that influences a likelihood of occurrence of the event during at least one of the plurality of future time intervals. For example, as shown in FIG. 9A, feature extractor 924 may generate a real-time feature from real-time data 914.

In step 1216, a temporal classification model may be selected from a plurality of temporal classification models, for example, based on a best prediction performance for the time series dataset. For example, as shown in FIG. 11, selector 1104 may select a trained temporal classification model from trained temporal classification model(s) 1108.

In step 1218, the selected temporal classification model may predict classification labels, for example, based on the temporal classification featurized dataset and any real-time signals. The classification labels may forecast whether the event will occur or a number of occurrences of the event that will occur in each of a plurality of future time intervals. For example, as shown in FIG. 11, selected trained temporal classification model(s) 1108 may predict (forecast) classification labels (forecasts) 1110 based on temporal classification featurized dataset 1102, which may include any real-time features generated by feature extractor 924.

In step 1220, a determination may be made whether to allocate or preallocate a computing resource or whether to prefetch information, a representation of information or a search index, based on the classification labels. For example, as shown in FIG. 11, determiner 1112 may determine 1114 whether to take any action(s) based on forecasts 1110. Action(s) may include, for example, allocating or preallocating a computing resource or prefetching information, a representation of information or a search index.

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

FIG. 13 shows an exemplary implementation of a computing device 1300 in which example embodiments may be implemented. Consistent with all other descriptions provided herein, the description of computing device 1300 is a non-limiting example for purposes of illustration. Example embodiments may be implemented in other types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random-access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing example embodiments described herein.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of example embodiments described herein. Accordingly, such computer programs represent controllers of the computing device 1300.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems and computer program products are provided for prefetching information and/or (pre)allocating computing resources based on predicting classification labels with temporal data. A trained temporal classification model forecasts events (e.g., too numerous for individual modeling) by predicting classification labels indicating whether events will occur, or a number of occurrences of the events, during each of a plurality of future time intervals. Time-series datasets, indicating whether events occurred, or a number of occurrences of the events, during each of a plurality of past time intervals, are transformed into temporal classification datasets. Classifications may be based, at least in part, on extracted features, such as data seasonality, temporal representation, statistical and/or real-time features. Classification labels are used to determine whether to take one or more actions, such as, for example, prefetching information or (pre)allocating a computing resource.

In an example, a system may comprise one or more processors; and one or more memory devices that store program code configured to be executed by the one or more processors. The program code may comprise a temporal classification model and a determiner. The temporal classification model may be configured to (i) receive a time series dataset indicating whether an event occurred, or a number of occurrences of the event that occurred, during each of a plurality of past time intervals; (ii) transform the time series dataset into a temporal classification dataset; and predict classification labels based on the temporal classification dataset, wherein the classification labels forecast whether the event will occur or a number of occurrences of the event that will occur in each of a plurality of future time intervals. The determiner may be configured to determine, based on the classification labels, whether to prefetch information into a memory or allocate or preallocate a computing resource.

In an example, the temporal classification model may be further configured to generate, based on the temporal classification dataset, at least one feature comprising at least one of a seasonality feature, a trend feature, a temporal representation feature and a statistical feature; and predict the classification labels based on the temporal classification dataset and the at least one feature.

In an example, the temporal classification model may be further configured to generate a real-time feature comprising an indicator that influences a likelihood of occurrence of the event during at least one of the plurality of future time intervals; and predict the classification labels based on the temporal classification dataset and the real-time feature.

In an example, the temporal classification model may be further configured to select a subset of the past time intervals in the time series dataset for transformation into the temporal classification dataset based on a lookback window beginning at an origin.

In an example, the program code may further comprise a selector configured to select the temporal classification model from a plurality of temporal classification models based on a best prediction performance for the time series dataset.

In an example, the temporal classification model may be trained by a training dataset and tested by a testing dataset created from a classification dataset comprising a plurality of time series classification datasets comprising a time series classification dataset for each of multiple subtypes or variants of the event. Each time series classification dataset may indicate whether the event occurred or a number of occurrences of the event during each of a plurality of past time intervals. Each time series classification dataset may comprise N past time intervals. Each time series classification dataset may comprise K training datasets with K time intervals and a K+1 label, where K is less than N.

In an example, the training dataset and the testing dataset may be created based on a temporal split of the classification dataset, for example, by selecting as the testing dataset a subset of the time series classification datasets comprising most recent time intervals and by selecting as the training dataset a subset of the time series classification datasets comprising less recent time intervals.

In an example, the temporal classification model may be evaluated and selected to predict events for future time intervals, for example, based on prediction performance statistics for the testing dataset compared to statistics thresholds for at least two of prediction precision, recall and accuracy.

In an example, a method may comprise, for example, predicting classification labels with temporal data by: (i) receiving a time series dataset indicating whether an event occurred, or a number of occurrences of the event that occurred, during each of a plurality of past time intervals; (ii) transforming the time series dataset into a temporal classification dataset; and predicting, by a temporal classification model, the classification labels based on the temporal classification dataset. The classification labels may forecast whether the event will occur, or a number of occurrences of the event that will occur, in each of a plurality of future time intervals. A determination may be made, based on the classification labels, whether to prefetch information into a memory or allocate or preallocate a computing resource.

In an example, the method may further comprise, for example, generating, based on the temporal classification dataset, at least one feature comprising at least one of a seasonality feature, a trend feature, a temporal representation feature and a statistical feature; and predicting, by the temporal classification model, the classification labels based on the temporal classification dataset and the at least one feature.

In an example, the method may further comprise, for example, generating a real-time feature comprising an indicator that influences a likelihood of occurrence of the event during at least one of the plurality of future time intervals; and predicting, by the temporal classification model, the classification labels based on the temporal classification dataset and the real-time feature.

In an example, the method may further comprise, for example, selecting the temporal classification model from a plurality of temporal classification models based on a best prediction performance for the time series dataset.

In an example, the temporal classification model may be trained by a training dataset and tested by a testing dataset created from a classification dataset, which may comprise a plurality of time series classification datasets comprising a time series classification dataset for each of multiple subtypes or variants of the event. Each time series classification dataset may indicate whether the event occurred or a number of occurrences of the event during each of a plurality of past time intervals. Each time series classification dataset may comprise N past time intervals. Each time series classification dataset may comprise K training datasets with K time intervals and a K+1 label, where K is less than N.

In an example, the training dataset and the testing dataset may be created based on a temporal split of the classification dataset, for example, by selecting as the testing dataset a subset of the time series classification datasets comprising most recent time intervals and by selecting as the training dataset a subset of the time series classification datasets comprising less recent time intervals.

In an example, a computer-readable storage medium may have program instructions recorded thereon that, when executed by a processing circuit, perform a method. The method may comprise, for example, predicting, by a temporal classification model, classification labels that forecast whether an event will occur, or a number of occurrences of the event that will occur in each of a plurality of future time intervals, based on a temporal classification dataset derived from a time series dataset indicating whether an event occurred, or a number of occurrences of the event that occurred, during each of a plurality of past time intervals; and determining whether to take at least one action based on the classification labels.

In an example, an event during a past or future time interval may comprise one of the following: (i) a request for information (e.g., a query prefetch or a search query index); (ii) a request for or a utilization of a computing resource (e.g., cloud, network, cpu, memory and/or storage; (iii) an order or a purchase of a good or service; (iv) a battery use or charging of a battery; or (v) a transportation service at a location.

In an example, the at least one action comprises one of the following: (i) prefetch the information or a representation of the information; (ii) allocate or pre-allocate computing resources; (iii) pre-allocate a search index for a search engine; (iv) order goods to restock inventory; (v) charge a battery or select a battery charging model; or (vi) direct a transportation service driver to a geographic area.

In an example, the temporal classification model may be trained by a training dataset and tested by a testing dataset created from a classification dataset comprising a plurality of time series classification datasets comprising a time series classification dataset for each of multiple subtypes or variants of the event. Each time series classification dataset may indicate whether the event occurred or a number of occurrences of the event during each of a plurality of past time intervals. Each time series classification dataset may comprise N past time intervals. Each time series classification dataset may comprise K training datasets with K time intervals and a K+1 label, where K is less than N.

In an example, the training dataset and the testing dataset may be created based on a temporal split of the classification dataset, for example, by selecting as the testing dataset a subset of the time series classification datasets comprising most recent time intervals and by selecting as the training dataset a subset of the time series classification datasets comprising less recent time intervals.

In an example, the training dataset and the temporal classification dataset may comprise at least one of a seasonality feature, a trend feature, a temporal representation feature and a statistical feature. The temporal classification model may predict the classification labels for the training dataset and the temporal classification dataset based on the temporal classification dataset and the at least one feature.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
one or more processors; and
one or more memory devices that store program code for execution by the one or more processors, the program code comprising:
a temporal classification model:
receives multiple time series datasets, each time series dataset indicating whether a corresponding subtype or variant of an event occurred, or a number of occurrences of the corresponding subtype or variant of the event that occurred, during each of a plurality of past time intervals;
transforms the multiple time series datasets into multiple temporal classification datasets; and
predicts classification labels for each corresponding subtype or variant of the event based on the multiple temporal classification datasets, wherein the classification labels forecast whether the corresponding subtype or variant of the event will occur or a number of occurrences of the corresponding subtype or variant of the event that will occur in each of a plurality of future time intervals; and
a determiner that determines, based on the classification labels, whether to prefetch information into a memory or allocate or preallocate a computing resource.

2. The system of claim 1, wherein the temporal classification model further:
generates, based on the multiple temporal classification datasets, at least one feature comprising at least one of a seasonality feature, a trend feature, a temporal representation feature and a statistical feature for each corresponding subtype or variant of the event; and
predicts the classification labels for each corresponding subtype or variant of the event based on the multiple temporal classification datasets and the corresponding at least one feature.

3. The system of claim 1, wherein the temporal classification model further:
generates, for each corresponding subtype or variant of the event, a real-time feature comprising an indicator that influences a likelihood of occurrence of the corresponding subtype or variant of the event during at least one of the plurality of future time intervals; and
predicts the classification labels for each corresponding subtype or variant of the event based on the multiple temporal classification datasets and the corresponding real-time feature.

4. The system of claim 1, wherein the temporal classification model further:
for each of the multiple time series datasets, selects a corresponding subset of the past time intervals in the time series dataset for transformation into a corresponding temporal classification dataset of the multiple temporal classification datasets based on a lookback window beginning at an origin.

5. The system of claim 1, wherein the program code further comprises:
a selector that selects the temporal classification model from a plurality of temporal classification models based on a best prediction performance for the multiple time series datasets.

6. The system of claim 1, wherein the temporal classification model is trained by a training dataset and tested by a testing dataset created from a classification dataset comprising:
a plurality of time series classification datasets comprising a time series classification dataset for each of multiple subtypes or variants of the event;
wherein each time series classification dataset indicates whether a corresponding subtype or variant of the event occurred or a number of occurrences of the corresponding subtype or variant of the event during each of a plurality of past time intervals;
wherein each time series classification dataset comprises N past time intervals; and
wherein each time series classification dataset comprises K training datasets with K time intervals and a K+1 label, where K is less than N.

7. The system of claim 6, wherein the training dataset and the testing dataset are created based on a temporal split of the classification dataset by selecting as the testing dataset a subset of the time series classification datasets comprising most recent time intervals and by selecting as the training dataset a subset of the time series classification datasets comprising less recent time intervals.

8. The system of claim 6, wherein the temporal classification model is evaluated and selected to predict subtypes or variants of events for future time intervals based on prediction performance statistics for the testing dataset compared to statistics thresholds for at least two of prediction precision, recall and accuracy.

9. A method, comprising:
predicting classification labels with temporal data by:
receiving a time series dataset indicating whether an event occurred, or a number of occurrences of the event that occurred, during each of a plurality of past time intervals;
transforming the time series dataset into a temporal classification dataset;
selecting a temporal classification model from a plurality of temporal classification models based on a best prediction performance for the time series dataset; and predicting, by the temporal classification model, the classification labels based on the temporal classification dataset,
   wherein the classification labels forecast whether the event will occur, or a number of occurrences of the event that will occur, in each of a plurality of future time intervals; and
determining, based on the classification labels, whether to prefetch information into a memory or allocate or preallocate a computing resource.

10. The method of claim 9, further comprising:
generating, based on the temporal classification dataset, at least one feature comprising at least one of a seasonality feature, a trend feature, a temporal representation feature and a statistical feature; and
predicting, by the temporal classification model, the classification labels based on the temporal classification dataset and the at least one feature.

11. The method of claim 9, further comprising:
generating a real-time feature comprising an indicator that influences a likelihood of occurrence of the event during at least one of the plurality of future time intervals; and
predicting, by the temporal classification model, the classification labels based on the temporal classification dataset and the real-time feature.

12. The method of claim 9, wherein the temporal classification model is trained by a training dataset and tested by a testing dataset created from a classification dataset comprising:
   a plurality of time series classification datasets comprising a time series classification dataset for each of multiple subtypes or variants of the event;
   wherein each time series classification dataset indicates whether the event occurred or a number of occurrences of the event during each of a plurality of past time intervals;
   wherein each time series classification dataset comprises N past time intervals; and
   wherein each time series classification dataset comprises K training datasets with K time intervals and a K+1 label, where K is less than N.

13. The method of claim 12, wherein the training dataset and the testing dataset are created based on a temporal split of the classification dataset by selecting as the testing dataset a subset of the time series classification datasets comprising most recent time intervals and by selecting as the training dataset a subset of the time series classification datasets comprising less recent time intervals.

14. The method of claim 9, further comprising:
selecting a subset of the past time intervals in the time series dataset for said transforming into the temporal classification dataset based on a lookback window beginning at an origin.

15. The method of claim 9, wherein said selecting the temporal classification model from the plurality of temporal classification models is based on the best prediction performance for the time series dataset compared to statistic thresholds for at least two of prediction precision, recall, and accuracy.

16. A computer-readable storage medium having program instructions recorded thereon that, when executed by a processing circuit, perform a method comprising:
predicting, by a temporal classification model, classification labels that forecast whether an event will occur, or a number of occurrences of the event that will occur in each of a plurality of future time intervals, based on a temporal classification dataset derived from a time series dataset indicating whether an event occurred, or a number of occurrences of the event that occurred, during each of a plurality of past time intervals, wherein the temporal classification model is trained by a training dataset and tested by a testing dataset created from a classification dataset comprising:
   a plurality of time series classification datasets comprising a time series classification dataset for each of multiple subtypes or variants of the event
   wherein each time series classification dataset indicates whether the event occurred or a number of occurrences of the event during each of a plurality of past time intervals;
   wherein each time series classification dataset comprises N past time intervals; and
   wherein each time series classification dataset comprises K training datasets with K time intervals and a K+1 label, where K is less than N; and
determining whether to take at least one action based on the classification labels.

17. The computer-readable storage medium of claim 16, wherein an event during a past or future time interval comprises one of the following:
   a request for information;
   a request for or a utilization of a computing resource;
   an order or a purchase of a good or service;
   a battery use or charging of a battery; or
   a transportation service at a location.

18. The computer-readable storage medium of claim 17, wherein the at least one action comprises one of the following:
   prefetch the information or a representation of the information;
   allocate or pre-allocate computing resources;
   pre-allocate a search index for a search engine;
   order goods to restock inventory;
   charge a battery or select a battery charging model; or
   direct a transportation service driver to a geographic area.

19. The computer-readable storage medium of claim 16, wherein the training dataset and the testing dataset are created based on a temporal split of the classification dataset by selecting as the testing dataset a subset of the time series classification datasets comprising most recent time intervals and by selecting as the training dataset a subset of the time series classification datasets comprising less recent time intervals.

20. The computer-readable storage medium of claim 16, wherein the training dataset and the temporal classification dataset comprise at least one of a seasonality feature, a trend feature, a temporal representation feature and a statistical feature; and
   wherein the temporal classification model predicts the classification labels for the training dataset and the temporal classification dataset based on the temporal classification dataset and the at least one feature.

* * * * *